US011690037B2

United States Patent
Bao et al.

(10) Patent No.: US 11,690,037 B2
(45) Date of Patent: Jun. 27, 2023

(54) TIMING ADVANCE (TA) HANDLING FOR SIDELINK (SL)-ASSISTED POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/811,830

(22) Filed: Jul. 11, 2022

(65) Prior Publication Data

US 2022/0353835 A1 Nov. 3, 2022

Related U.S. Application Data

(63) Continuation of application No. 17/160,593, filed on Jan. 28, 2021, now Pat. No. 11,425,675.

(51) Int. Cl.
*H04W 56/00* (2009.01)
*H04L 5/00* (2006.01)
(Continued)

(52) U.S. Cl.
CPC ......... *H04W 56/005* (2013.01); *H04L 5/0051* (2013.01); *H04L 27/2607* (2013.01); *H04W 56/006* (2013.01); *H04W 92/18* (2013.01)

(58) Field of Classification Search
CPC .. H04B 1/69; H04B 15/00; H04B 2001/6904; H04B 7/24; H04J 11/0056; H04J 13/0022; H04W 88/08
See application file for complete search history.

(56) References Cited

U.S. PATENT DOCUMENTS

| 11,425,675 B2 | 8/2022 | Bao et al. |
| 2014/0370904 A1 | 12/2014 | Smith et al. |

(Continued)

OTHER PUBLICATIONS

Intel Corporation: "Discussion on UE RX-TX Time Difference Measurement Requirements for NR Pos", 3GPP Draft, 3GPP TSG-RAN WG4 Meeting# 98-e, R4-2101273, 3rd Generation Partnership Project (3GPP), Mobile Competence Centre, 650, Route Des Lucioles, F-06921 Sophia-Antipolis Cedex, France, vol. RAN WG4, No. Electronic Meeting, Jan. 25, 2021-Feb. 5, 2021, Jan. 15, 2021 (Jan. 15, 2021), XP051972398, 7 Pages, Retrieved from the Internet: URL: https://ftp.3gpp.org/tsg_ran/WG4_Radio/TSGR4_98_e/Docs/R4-2101273.zip R4-2101273 NR Positioning UE RX-TX Time Difference ore RRM rl.docx [Retrieved on Jan. 15, 2021] The Whole Document.

(Continued)

*Primary Examiner* — Nathan S Taylor
(74) *Attorney, Agent, or Firm* — Thien T. Nguyen

(57) ABSTRACT

Timing advance (TA) handling for sidelink (SL)-assisted positioning of a first user equipment (UE), comprises determining the first UE is configured to transmit an SL positioning reference signal (SL-PRS) to a second UE for the SL-assisted positioning. A guard period length can be determined based on a configuration of the first UE for transmitting the SL-PRS, where the guard period may comprise a period of time during which the SL-PRS is transmitted by the first UE. A message can be sent to a serving transmission reception point (TRP) of the first UE, where the message indicates the guard period and comprises a TA-related request. The TA-related request includes a request to postpone applying a TA command received by the first UE until after the guard period, or a request for the serving TRP not to send a TA command to the first UE during the guard period.

30 Claims, 12 Drawing Sheets

(51) Int. Cl.
*H04L 27/26* (2006.01)
*H04W 92/18* (2009.01)

(56) References Cited

U.S. PATENT DOCUMENTS

| | | | | |
|---|---|---|---|---|
| 2017/0331577 | A1* | 11/2017 | Parkvall | H04W 4/00 |
| 2019/0173612 | A1* | 6/2019 | Kimura | H04W 72/0473 |
| 2019/0182806 | A1* | 6/2019 | Chae | H04L 1/1812 |
| 2019/0306923 | A1* | 10/2019 | Xiong | H04L 5/0091 |
| 2020/0015230 | A1* | 1/2020 | Chae | H04L 5/0044 |
| 2020/0374728 | A1 | 11/2020 | Manolakos et al. | |
| 2020/0396744 | A1* | 12/2020 | Xiong | H04W 72/0446 |
| 2021/0105867 | A1* | 4/2021 | Akkarakaran | H04W 56/0045 |
| 2021/0119843 | A1* | 4/2021 | Zhang | H04L 27/2613 |
| 2021/0243554 | A1* | 8/2021 | Wu | H04W 4/023 |
| 2021/0329568 | A1* | 10/2021 | Zhang | H04W 52/346 |
| 2021/0331701 | A1* | 10/2021 | Hur | G05D 1/0022 |
| 2022/0103265 | A1* | 3/2022 | Ghozlan | H04B 7/24 |
| 2022/0393820 | A1* | 12/2022 | Keating | H04W 76/14 |

OTHER PUBLICATIONS

International Search Report and Written Opinion—PCT/US2021/072636—ISA/EPO—Mar. 18, 2022.

* cited by examiner

TIMING ADVANCE (TA) HANDLING FOR SIDELINK (SL)-ASSISTED POSITIONING

RELATED APPLICATIONS

This application is a continuation of U.S. Non-Provisional application Ser. No. 17/160,593, filed Jan. 28, 2021, entitled "TIMING ADVANCE (TA) HANDLING FOR SIDELINK (SL)-ASSISTED POSITIONING," which is assigned to the assignee hereof and incorporated by reference herein in its entirety.

BACKGROUND

1. Field of Invention

The present invention relates generally to the field of wireless communications, and more specifically to determining the location of a User Equipment (UE) using radio frequency (RF) signals.

2. Description of Related Art

The use of a sidelink (SL) interface in the positioning of a UE for which a position is to be determined (or "target UE") may be similar in ways to the use of base stations. However, unlike base stations, UEs used to position the target UE (or "anchor UEs") may be subject to Timing Advance (TA) commands. These commands can impact the transmission times of reference signals used to position the target UE, which, in turn, can impact the accuracy of the position estimate of the target UE. Applicable communication standards for SL-based positioning currently have no way of accounting for these TA commands.

BRIEF SUMMARY

An example method of timing advance (TA) handling for sidelink (SL)-assisted positioning of a first user equipment (UE), according to this disclosure, comprises determining the first UE is configured to transmit an SL positioning reference signal (SL-PRS) to a second UE to perform the SL-assisted positioning. The method also comprises determining a length of time for a guard period based on a configuration of the first UE for transmitting the SL-PRS, where the guard period may comprise a period of time during which the SL-PRS is transmitted by the first UE. The method also comprises sending, to a serving transmission reception point (TRP) of the first UE, a message indicating the guard period and may comprise a TA-related request, where the TA-related request includes: a request to postpone applying a TA command received by the first UE until after the guard period, or a request for the serving TRP not to send a TA command to the first UE during the guard period.

Another example a method of timing advance (TA) handling for sidelink (SL)-assisted positioning of a first user equipment (UE), according to this disclosure, comprises receiving, at a serving transmission reception point (TRP) of the first UE, a message from a network node, the message indicating a guard period and may comprise a TA-related request, where: the guard period may comprise a period of time during which an SL positioning reference signal (SL-PRS) is transmitted by the first UE to a second UE; and the TA-related request may comprise: a request to postpone applying a TA command received by the first UE until after the guard period, or a request for the serving TRP not to send a TA command to the first UE during the guard period. The method also comprises determining a response to the message based on an applicable TA priority condition. The method also comprises sending the response to the network node.

An example device for providing timing advance (TA) handling for sidelink (SL)-assisted positioning of a first user equipment (UE), according to this disclosure, comprises a communication interface, a memory, and one or more processing units communicatively coupled with the communication interface and the memory. The one or more processing units configured to determine the first UE is configured to transmit an SL positioning reference signal (SL-PRS) to a second UE to perform the SL-assisted positioning. The one or more processing units are also configured to determine a length of time for a guard period based on a configuration of the first UE for transmitting the SL-PRS, where the guard period may comprise a period of time during which the SL-PRS is transmitted by the first UE. The one or more processing units are also configured to send, to a serving transmission reception point (TRP) of the first UE via the communication interface, a message indicating the guard period and may comprise a TA-related request, where the TA-related request includes: a request to postpone applying a TA command received by the first UE until after the guard period, or a request for the serving TRP not to send a TA command to the first UE during the guard period.

Another example device for providing timing advance (TA) handling for sidelink (SL)-assisted positioning of a first user equipment (UE), according to this disclosure, comprises a communication interface, a memory, and one or more processing units communicatively coupled with the communication interface and the memory. The one or more processing units are configured to receive, via the communication interface, a message from a network node, the message indicating a guard period and may comprise a TA-related request, where the guard period may comprise a period of time during which an SL positioning reference signal (SL-PRS) is transmitted by the first UE to a second UE; and the TA-related request may comprise a request to postpone applying a TA command received by the first UE until after the guard period, or a request for a serving transmission reception point (TRP) not to send a TA command to the first UE during the guard period. The one or more processing units are also configured to determine a response to the message based on an applicable TA priority condition, and send, via the communication interface, the response to the network node.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Figure 1:
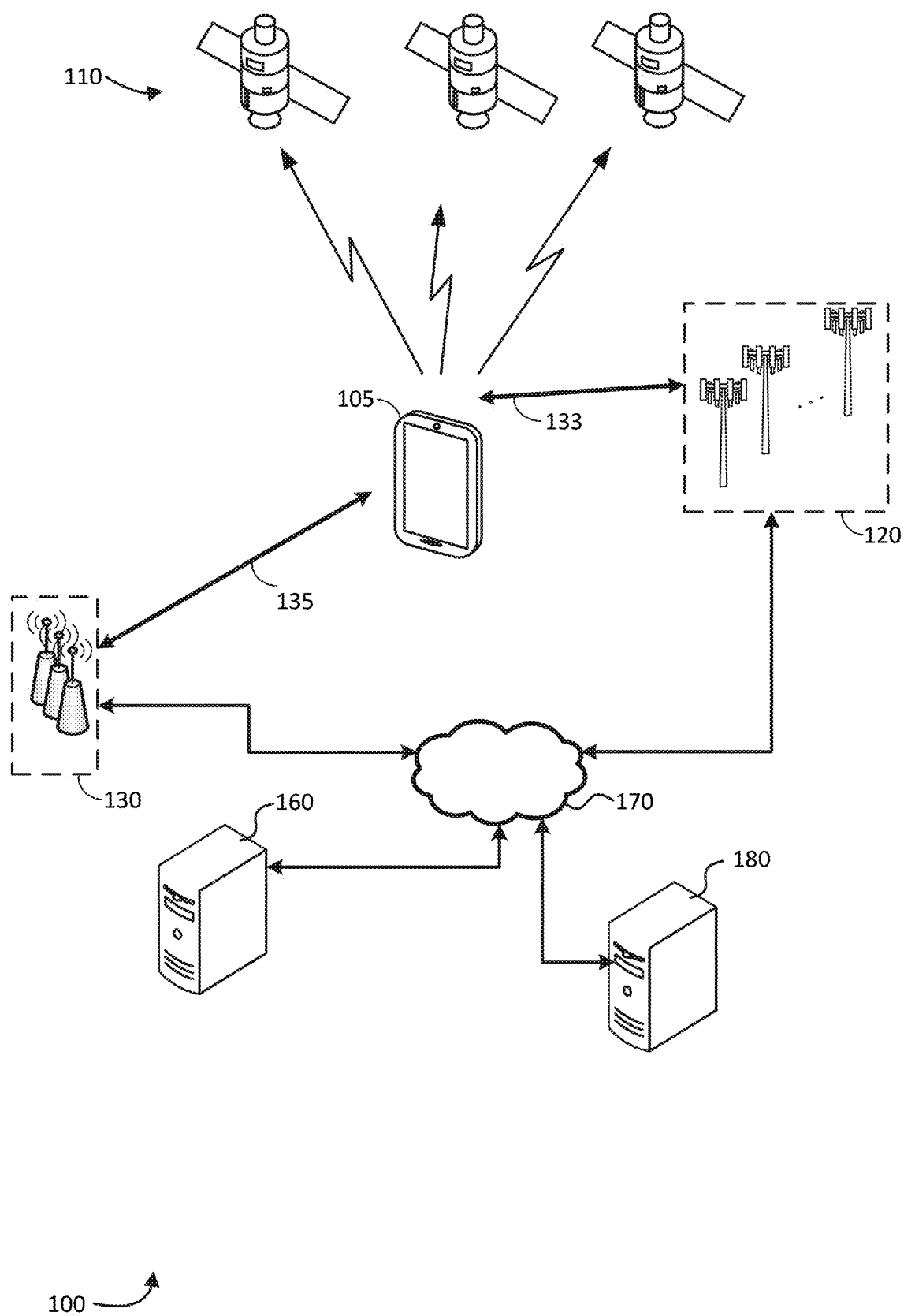
FIG. 1 is a diagram of a positioning system, according to an embodiment.

FIG. 1 is a simplified illustration of a positioning system 100 in which a UE 105, location server 160, and/or other components of the positioning system 100 can use the techniques provided herein for handling Timing Advance (TA) commands when determining an estimated location of UE 105 using sidelink (SL)-assisted positioning, according to an embodiment. Again, when determining the position of a UE (e.g., UE 105) it may be referred to as a "target UE." The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted, and as discussed in more detail below, the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, a location of the UE 105 may be estimated at least in part based on measurements of RF signals communicated between the UE 105 and one or more other UEs (not shown in FIG. 1), which may be mobile. Direct communication between the one or more other UEs and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Figure 2:
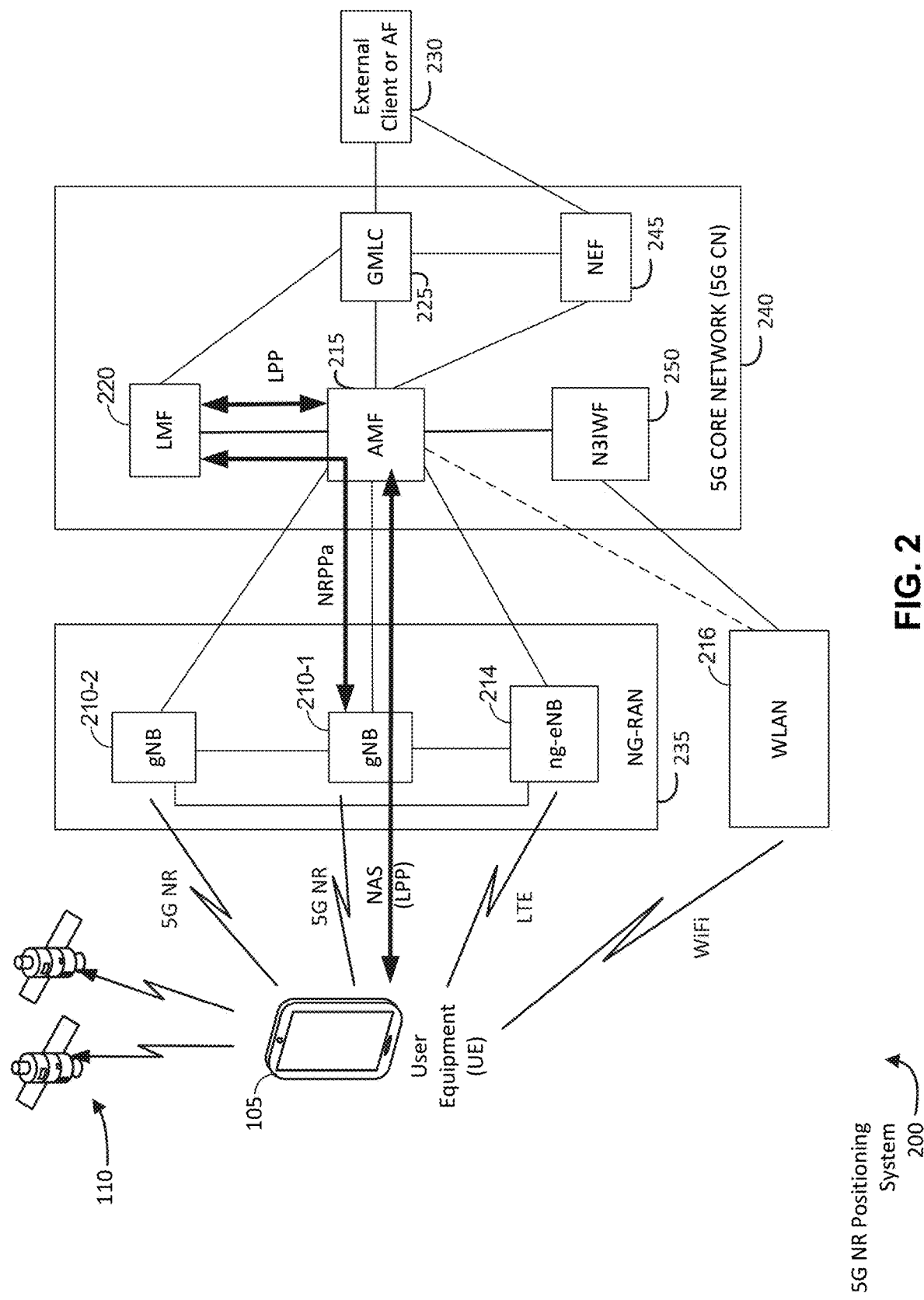
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more ANs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA) or DL-TDOA), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF

220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol A (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, OTDOA, multi-cell RTT, AOD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE 105 (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for OTDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 3:
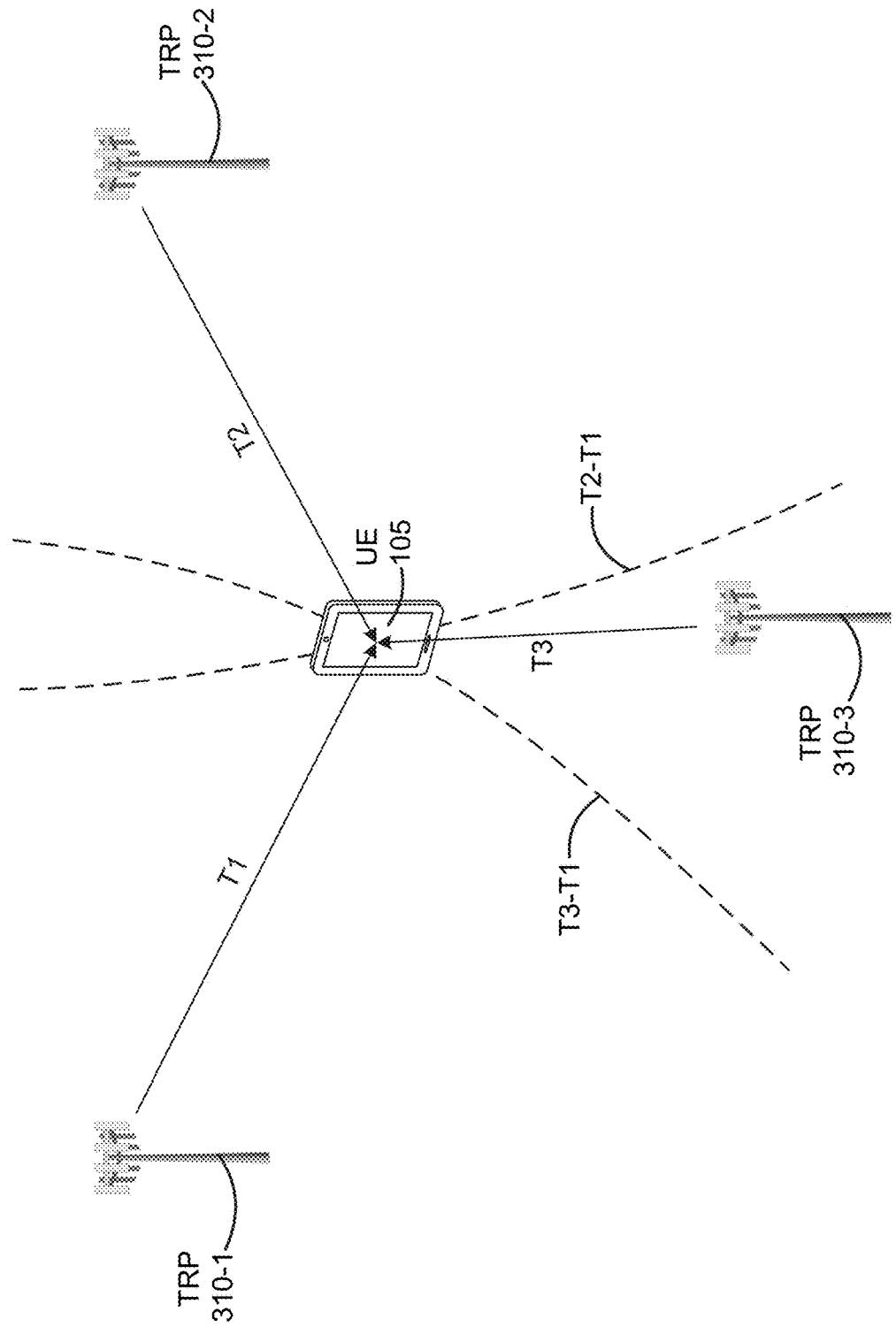
FIGS. 3 and 4 are illustrations of different types of positioning methods used to determine the location of a UE, according to an embodiment.

FIG. 3 is an illustration how TDOA-based positioning can be made, according to some embodiments. In brief, TDOA-based positioning is positioning made based on known positions of TRPs (e.g., TRPs 310-1, 310-2, and 310-3, collectively and generically referred to herein as TRPs 310), known times at which TRPs transmit respective reference signals (e.g., PRS), and differences in times at which the UE 105 receives the reference signals from each TRP. Again, a TRP may correspond with a base station, such as base stations 120 of FIG. 1. In a 5G NR positioning system 200, a TRP may include a gNB 210 and/or ng-eNB 214, as illustrated in FIG. 2.

In TDOA-based positioning, a location server may provide TDOA assistance data to a UE P105 for a reference TRP (which may be called a "reference cell" or "reference resource"), and one or more neighboring TRPs (which may be called "neighbor cells" or "neighboring cells", and which individually may be called a "target cell" or "target resource") relative to the reference TRP. For example, the assistance data may provide the center channel frequency of each TRP, various PRS configuration parameters (e.g., $N_{PRS}$, $T_{PRS}$, muting sequence, frequency hopping sequence, PRS ID, PRS bandwidth), a TRP (cell) global ID, PRS signal characteristics associated with a directional PRS, and/or other TRP related parameters applicable to TDOA or some other position method. TDOA-based positioning by a UE 105 may be facilitated by indicating the serving TRP for the UE 105 in the TDOA assistance data (e.g., with the reference TRP indicated as being the serving TRP). In some aspects, TDOA assistance data may also include "expected Reference Signal Time Difference (RSTD)" parameters, which provide the UE 105 with information about the RSTD values the UE 105 is expected to measure at its current location between the reference TRP and each neighbor TRP, together with an uncertainty of the expected RSTD parameter. The expected RSTD, together with the associated uncertainty, may define a search window for the UE 105 within which the UE 105 is expected to measure the RSTD value. TDOA assistance information may also include PRS configuration information parameters, which allow a UE 105 to determine when a PRS positioning occasion occurs on signals received from various neighbor TRPs relative to PRS positioning occasions for the reference TRP, and to determine the PRS sequence transmitted from various TRPs in order to measure a time of arrival (TOA) or RSTD. TOA measurements may be RSRP (Reference Signal Receive Power) measurements of average power of Resource Elements (RE) that carry PRS (or other reference signals).

Using the RSTD measurements, the known absolute or relative transmission timing of each TRP, and the known position(s) of wireless node physical transmitting antennas for the reference and neighboring TRPs, the UE position may be calculated (e.g., by the UE 105 or by a location server). More particularly, the RSTD for a neighbor TRP "k" relative to a reference TRP "Ref," may be given as the difference in TOA measurements of signals from each TRP (i.e., $TOA_k - TOA_{Ref}$), where the TOA values may be measured modulo one subframe duration (1 ms) to remove the effects of measuring different subframes at different times. In FIG. 3, for example, a first TRP 310-1 may be designated as the reference TRP, and second and third TRPs (P110-2 and 310-3) are neighbor TRPs. If UE 105 receives reference signals from first TRP 310-1, second TRP 310-2, and third TRP 310-3 at times T1, T2, and T2, respectively, then the RSTD measurement for second TRP 310-2 would be determined as T2–T1 and the RSTD measurement for third TRP 310-3 would be determined as T3–T1. RSTD measurements can be used by the UE 105 and/or sent to a location server to determine the location of the UE 105 using (i) the RSTD measurements, (ii) the known absolute or relative transmission timing of each TRP, (iii) the known position(s) of TRPs 310 for the reference and neighboring TRPs, and/or (iv) directional PRS characteristics such as a direction of transmission. Geometrically, information (i)-(iv) allows for possible locations of the UE 105 to be determined for each RSTD (where each RSTD results in a hyperbola, as shown in FIG. 3), and the position of the UE 105 to be determined from the intersection of the possible locations for all RSTDs.

Figure 4:
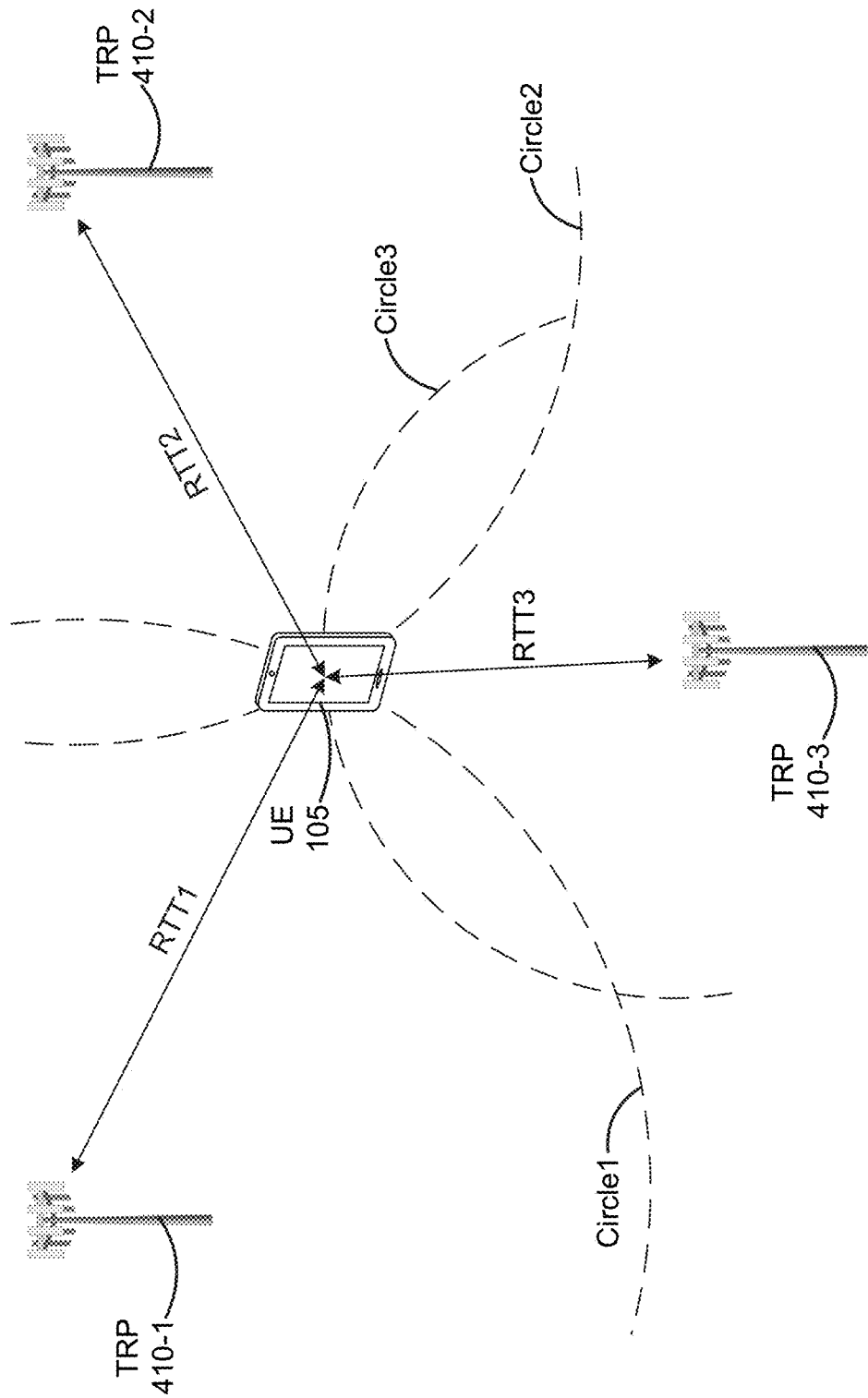

FIG. 4 is an illustration how RTT-based positioning (or multi-RTT) can be made, according to some embodiments. In brief, RTT-based positioning includes positioning methods in which the position of the UE 105 is determined based on known positions of TRPs (e.g., TRPs 410, which again may correspond to gNBs 210 and/or ng-eNB 214 of FIG. 2) and known distances between the UE 105 and the TRPs. RTT measurements between the UE 105 and each TRP are used to determine a distance between the UE 105 and the respective TRP, and multilateration can be used to determine the location of the UE 105.

In RTT-based positioning, a location server may coordinate RTT measurements between the UE 105 and each TRP. Information provided to the UE 105 may be included in RTT assistance data. This can include, for example, reference signal (e.g., PRS) timing and other signal characteristics, TRP (cell) ID, and/or other cell related parameters applicable to multi-RTT or some other position method. Depending on desired functionality, RTT measurements may be made (and initiated by) the UE 105 or a TRP 410.

RTT measurements measure distance using Over The Air (OTA) delay. An initiating device (e.g., the UE 105 or a TRP 410) transmits a first reference signal at first time, T1, which propagates to a responding device. At a second time, T2, the first reference signal arrives at the responding device. The OTA delay (i.e., the propagation time it takes for the first reference signal to travel from the initiating device to the responding device) is the difference between T1 and T2. The responding device then transmits a second reference signal at a third time, T3, and the second reference signal is received and measured by the initiating device at a fourth time, T4. RSRP measurements may be used to determine TOA for times T2 and T4. Distance, d, between the initiating and responding devices therefore can be determined using the following equation:

$$\frac{2d}{c} = (T_4 - T_1) - (T_3 - T_2) = (T_4 - T_1) + (T_2 - T_3). \quad (1)$$

(As will be appreciated, distance, d, divided by the speed of RF propagation, c, equals the OTA delay.) Thus, a precise determination of the distance between the initiating device and responding device can be made.

RTT measurements between the UE 105 and TRPs 410 can therefore allow the position of the UE 105 to be determined using multilateration. That is, RTT measurements between the UE 105 and the first TRP 410-1, second TRP 210-2, and third TRP 410-3 (RTT measurements RTT1, RTT2, and RTT3, respectively) result in a determination of the distance of the UE 105 from each of the TRPs 410. These distances can be used to trace circles around known positions of the TRPs 410 (where Circle1 corresponds to TRP 410-1, Circle2 corresponds to TRP 410-2, and Circle3 corresponds to TRP 410-3.) The position of the UE 105 can be determined as the intersection between the circles.

Figure 5:
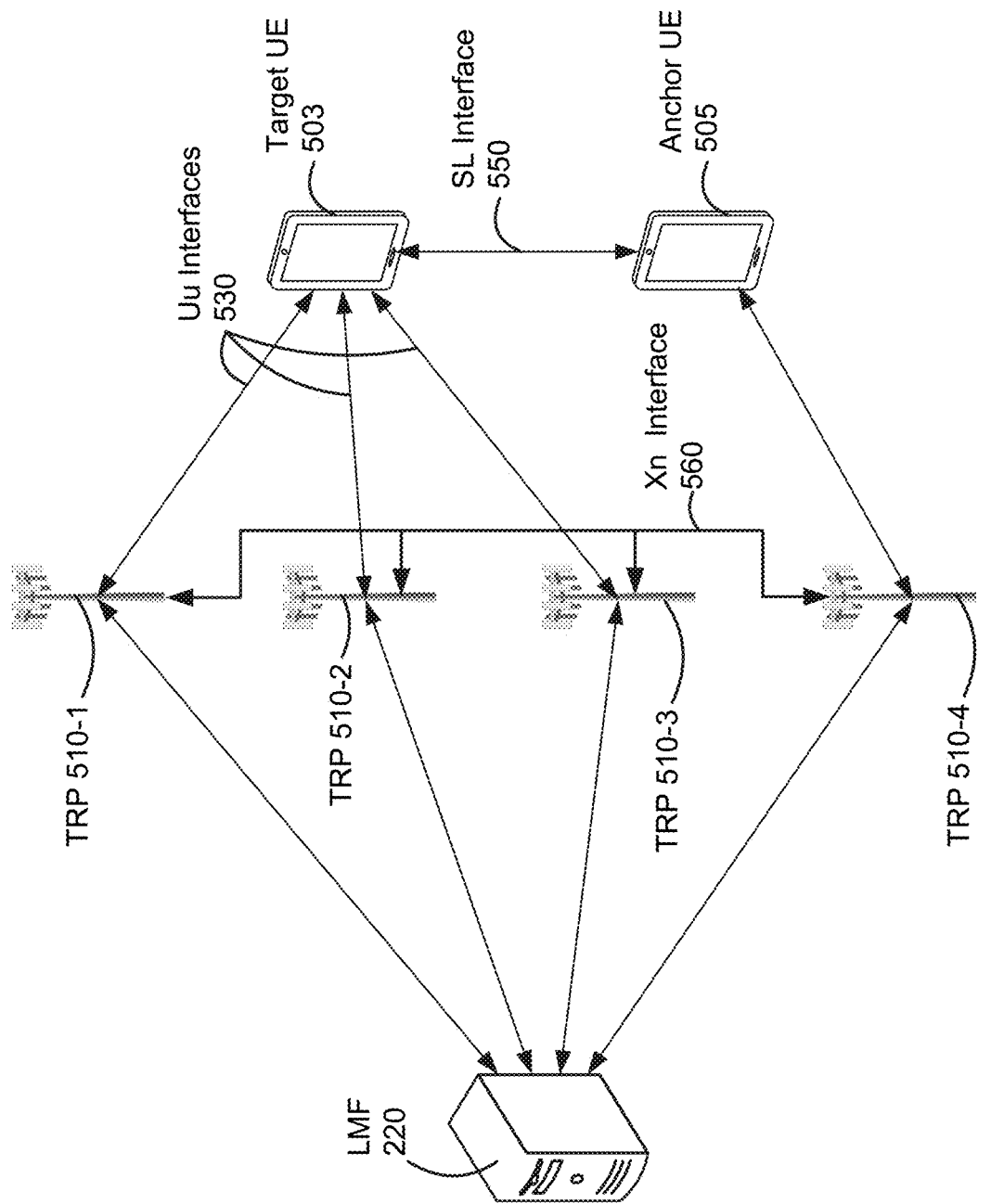
FIG. 5 is a simplified diagram illustrating how an anchor UE can be used in the positioning of a UE in a 5G NR network, according to an embodiment.

FIG. 5 is a simplified diagram illustrating how an anchor UE 505 can be used in the positioning of a target UE 503 in a 5G NR network, according to an embodiment. Here, arrows between the various components illustrate communication links. As illustrated in FIG. 2, this may involve wireless and/or wired communication technologies and may include one or more intermediary components. TRPs 510-1, 510-2, 510-3, and 510-4 may be referred to collectively or generically referred to as TRP(s) 510. For simplicity, a single anchor UE 505 is illustrated. However, although only one anchor UE 505 may be used in some instances, other instances may use two or more. Moreover, in some instances, anchor UEs 505 may comprise the only type of anchor point for positioning and/or TRPs 510 may not be used as anchor points. (As used herein, the term "anchor point" refers to a device with a known location used to determine the location of the target UE 503.) Further, although anchor UE 505 and target UE 503 are illustrated as having separate serving TRPs (TRP 510-4 and TRP 510-1, respectively), embodiments are not so limited. In some scenarios, for example, target UE 503 and anchor UE 505 may share a common serving TRP 510.

To determine the position of the target UE 503 (e.g., using any of the previously-described positioning techniques) the target UE 503 can take measurements of wireless signals sent from different anchor points: TRPs 510-1 to 510-3 and anchor UE 505. The target UE 503 can communicate with and/or obtain measurements from TRP 510-1 to TRP 510-3 using a Uu (network) interface 530. Measurements may be made from reference signals from the TRPs 510, such as PRS (e.g., DL-PRS). With regard to anchor UE 505, target UE 503 can communicate using SL interface 550. As previously noted, and SL interface 550 allows direct (D2D) communication between the target UE 503 and anchor UE 505, and may be used in a manner similar to the Uu interfaces 530, allowing the target UE 503 to obtain position-related measurements in relation to determining the location of the target UE 503. As such, the anchor UE 505 may be configured to provide a PRS (e.g., SL-PRS) and/or similar reference signal via the SL interface 550, which may be transmitted in a manner similar to a TRP. For its part, the anchor UE 505 may also communicate with the LMF 220 via TRP 510-4 using a Uu interface 530. As noted, TRP 510-4 may comprise the serving TRP for anchor UE 505 in this example.

The use of an anchor UE 505 in the positioning of the target UE 503 is similar to the use of base stations in FIGS. 3 and 5 for TDOA-based and RTT-based positioning. The use of anchor UEs 505 in this manner can be beneficial, providing additional accuracy to a position estimate of the target UE 503 and/or enabling for a threshold number of anchor points in cases where the target UE 503 is unable to communicate with a sufficient number of TRPs 510 for positioning (e.g., fewer than three). However, as noted, an anchor UE 505 may be subject to a Timing Advance (TA) command which, if received and applied during a positioning session of the target UE 503, can impact the timing of the transmission of SL-PRS via the SL interface 550. This can, in turn, impact the reliability and accuracy of the position estimate for the target UE 503.

Figure 6:
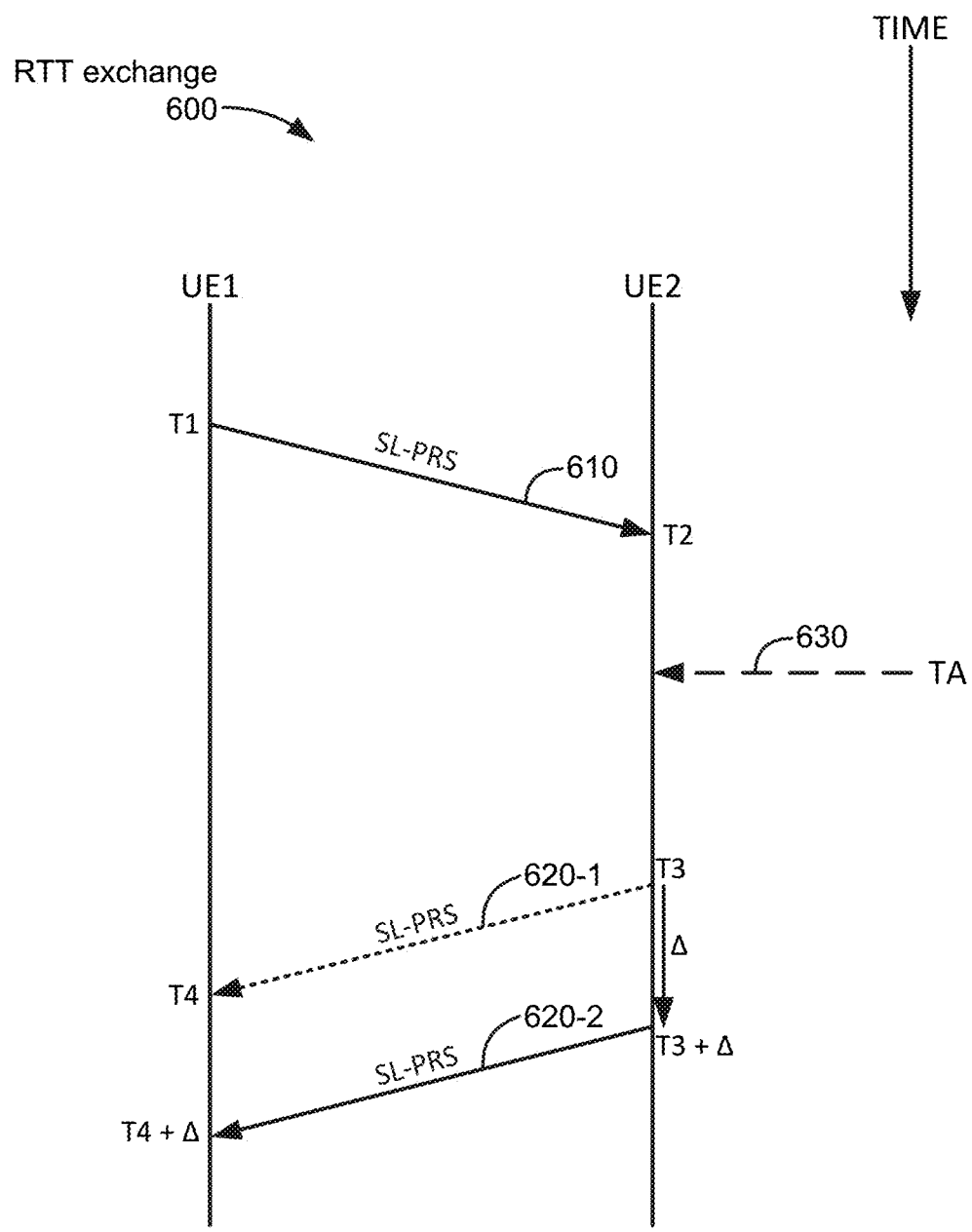
FIG. 6 is a timing diagram illustrating an round trip signal propagation delay (RTT) exchange 600 between two UEs, according to an embodiment.
Figure 7:
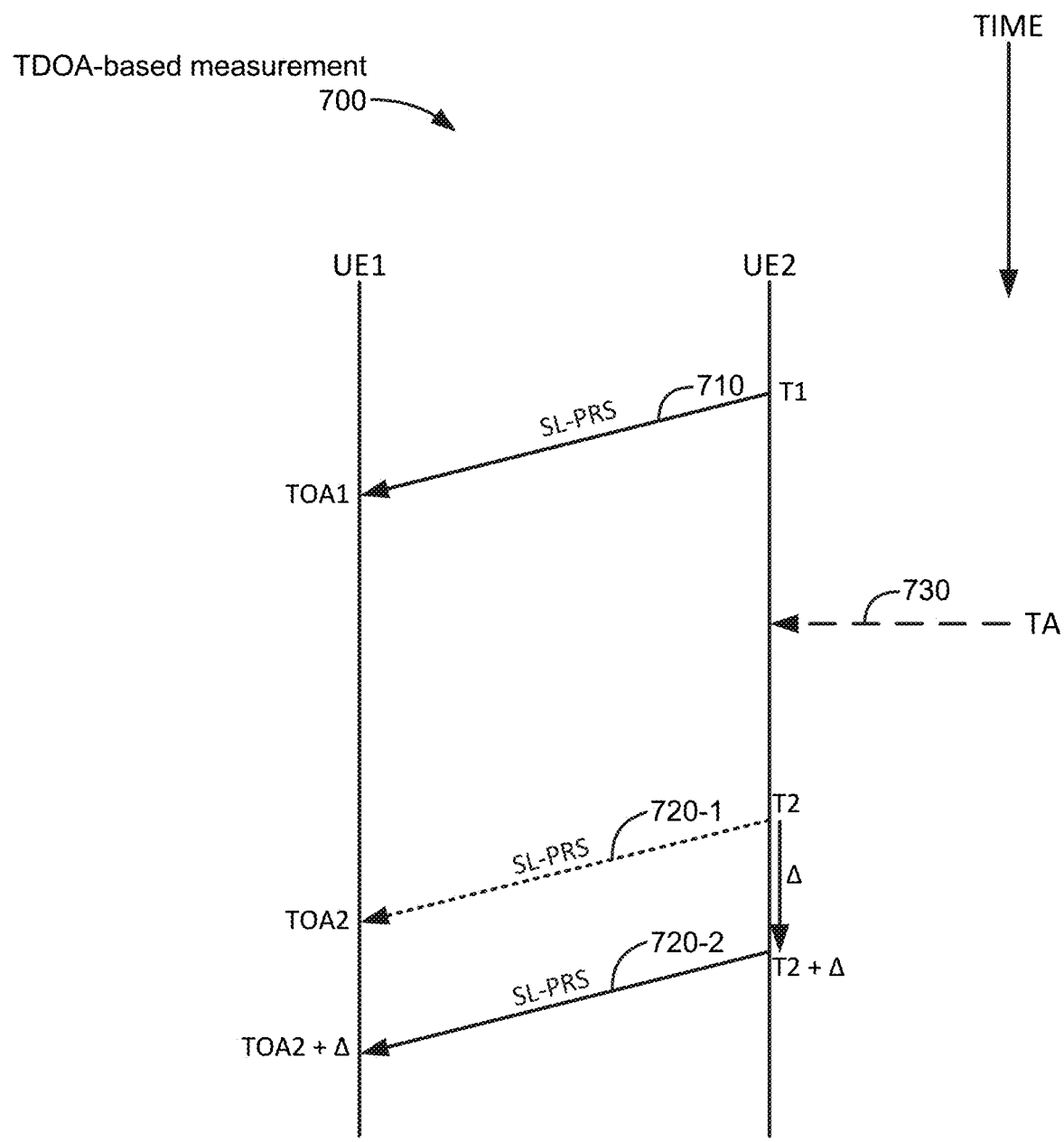
FIG. 7 is a timing diagram illustrating a Time Difference Of Arrival (TDOA)-based measurement between two UEs, according to an embodiment.

TA is used to control the uplink transmission timing of a UE. This can help ensure UE transmissions from multiple UEs are synchronized with a serving TRP when the transmissions are received by the serving TRP. To maintain this synchronization, the serving TRP can issue TA commands to a UE to cause the UE to make TA adjustments to stay in synchronization. These TA commands can be issued by the TRP, for example, when the propagation delay between the UE and TRP changes, which can result from movement by the UE. Although it is primarily applicable to PUSCH, PUCCH, and SRS signals, it can impact the transmission time of an SL-PRS if received during an SL-PRS positioning session between UEs. In particular, an SL-PRS transmitted by an anchor UE 505 may include a timestamp to allow a target UE 503 or location server to accurately calculate an RTT or TDOA measurement based on the SL-PRS. However, TA-related adjustments may not be accurately reflected in timestamps and may therefore result in inaccurate measurements and ultimately the inaccurate positioning of the target UE 503. FIGS. 6 and 7 illustrate two examples.

FIG. 6 is a timing diagram illustrating an RTT exchange 600 between two UEs, which may occur over an SL interface 550 (FIG. 5) during RTT-based, SL-assisted positioning of a UE. Here, UE 1 may correspond with a target UE 503 and UE two may correspond with an anchor UE 505, but embodiments are not so limited. Transmission/reception times T1-T4 correspond with those previously described with respect to RTT-based positioning (e.g., times T1-T4 in equation (1)). This RTT exchange 600 may occur during an SL-PRS positioning session between the UE 1 and UE 2. Timing and other aspects of the RTT exchange 600 may be based on an SL-PRS configuration received by the UEs from a TRP and/or location server (e.g., LMF 220).

In this example, UE1 transmits a first SL-PRS 610 at time T1, which is received by UE2 at time T2. UE2 is configured to transmit a second SL-PRS 620-1 at time T3, which would be received by UE1 at time T4. However, UE2 receives a TA command 630 that UE2 applies between times T2 and T3. In this case, this causes a delay of Δ. Thus, rather than transmitting the SL-PRS 620-1 at time T3, UE2 transmits an SL-PRS 620-2 at time T3+Δ. It can be noted that, depending on the TA adjustment made by UE2 in response to the TA command 630, Δ may not necessarily result in a delay in the transmission of SL-PRS 620-2 as illustrated in FIG. 6. In other instances, for example, Δ could be a negative value resulting in an earlier transmission.

The value of Δ can lead to an inaccurate RTT measurement (and, resultantly, an inaccurate determination of distance between UE1 and UE2) if unaccounted for. In particular, Δ may be combined with clock drift between T1 and T2, which can result in an inaccurate Rx-Tx measurement by UE2 used to determine the RTT measurement. This inaccurate Rx-Tx measurement can, in turn, cause errors in the determination of a location for UE 1, for example.

Furthermore, accounting for Δ in the calculation of the RTT measurement may not be straightforward. The RTT measurement may be calculated at UE1 (e.g., using equation (1) above) or at a location server that receives times T1-T4 from UE1. However, TA commands are UE-specific, typically provided to the UE by the UE's serving TRP via random access channel (RACH) response (e.g., during handover of the UE from one cell to another) or via Medium Access Control (MAC) Control Element (CE) (MAC-CE). As such, UE1 and the location server are unaware of TA commands received by UE2 and are thereby unable to account for TA adjustments during the RTT exchange 600.

FIG. 7 is a timing diagram illustrating a TDOA-based measurement 700 using two UEs, similar to FIG. 6. Again, this may take place over an SL interface 550 (FIG. 5) during TDOA-based, SL-assisted positioning of a UE. In this example, the TDOA-based measurement 700 is based on a series of SL-PRS transmitted by UE2 and received by UE1. However, after transmitting a SL-PRS 710 at time T1 and before transmitting a SL-PRS 720-1 at time T2, UE2 receives a TA command 730. Similar to the RTT exchange 600 of FIG. 6, this causes a delay of A in the transmission of SL-PRS 720-1 by UE2. Thus, rather than transmitting the SL-PRS 720-1 at time T2, UE2 transmits an SL-PRS 720-2 at time T2+Δ, and UE1 receives SL PRS 720-2 at TOA2+Δ. (Again, in some instances A could be a negative value resulting in an earlier transmission.) More generally, for TDOA-based positioning, such as TDOA-based measurement 700, applying a TA cannot only impact the transmission time of a single subsequent SL-PRS, but may impact all subsequent occasion times/repetitions of an SL-PRS. Similar to RTT-based positioning, this can cause inaccuracies in the TDOA-based measurement and ultimately in the position estimate a UE.

Embodiments address these and other issues by allowing for a TA command for an anchor UE to be postponed or omitted until after the anchor UE conducts an SL-PRS positioning session with a target UE. Alternatively, embodiments may allow an anchor UE to report TA adjustments made during an SL-PRS positioning session to a target UE or a location server to allow the target UE or location server to account for such TA adjustments when determining the position of the target UE. A description of an embodiment is provided hereinafter with regard to FIG. 8.

Figure 8:
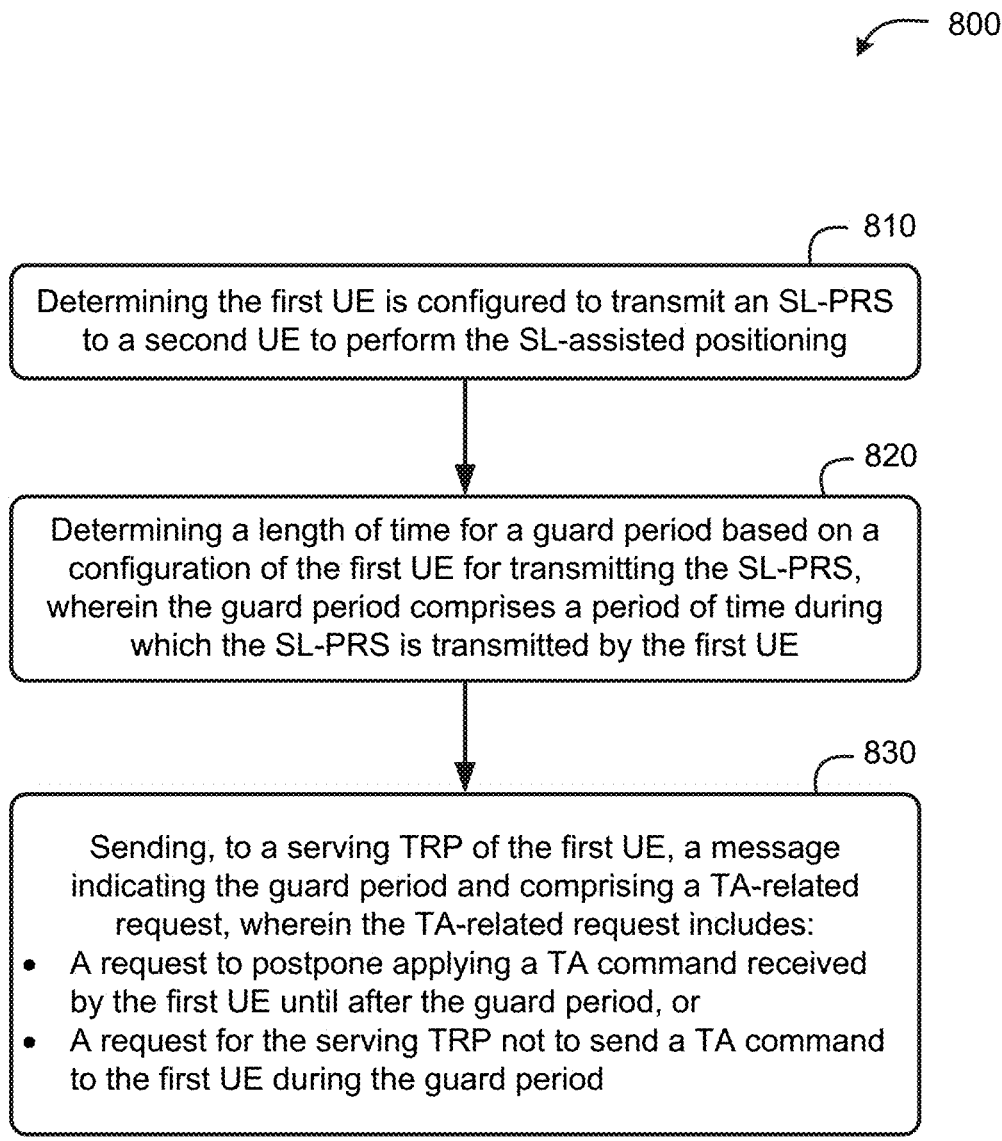
FIGS. 8 and 9 are flow diagrams of methods of Timing Advance (TA) handling for sidelink (SL)-assisted positioning of a first UE, according to some embodiments.
Figure 12:
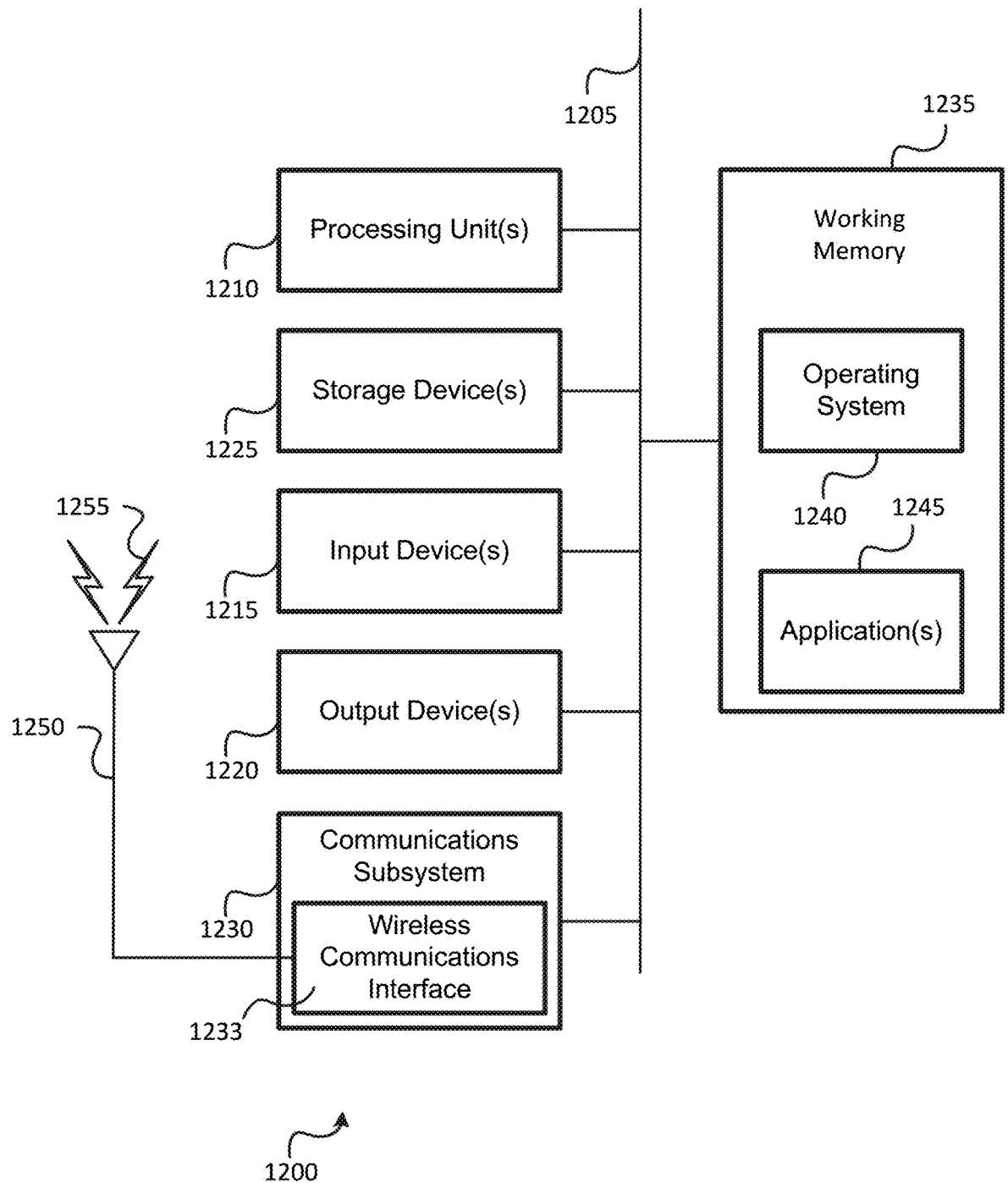
FIG. 12 is a block diagram of an embodiment of a computer system, which can be utilized in embodiments as described herein.

FIG. 8 is a flow diagram of a method 800 of TA handling for SL-assisted positioning of a first UE, according to an embodiment. Means for performing the functionality illustrated in one or more of the blocks shown in FIG. 8 may be performed by hardware and/or software components of a UE (e.g., an anchor UE 505 of FIG. 5) or location server (e.g., location server 160 of FIG. 1 or LMF 220 of FIG. 2). Example components of a UE are illustrated in FIG. 10, and example components of a computer server are illustrated in FIG. 12, both of which are described in more detail below.

The method 800 can begin with the functionality at block 810, which comprises determining the first UE is configured to transmit an SL-PRS to a second UE to perform the SL-assisted positioning. This determination can be made, for example, by the first UE itself, based on an SL-PRS configuration it receives from a location server or TRP to engage in an SL-PRS positioning session with the second UE (e.g., a target UE 503). Alternatively, this determination may be made by the location server, upon configuring the first UE. As previously noted, SL-PRS can be used to make RTT and/or TDOA measurements with which the position of the second UE may be estimated.

Figure 10:
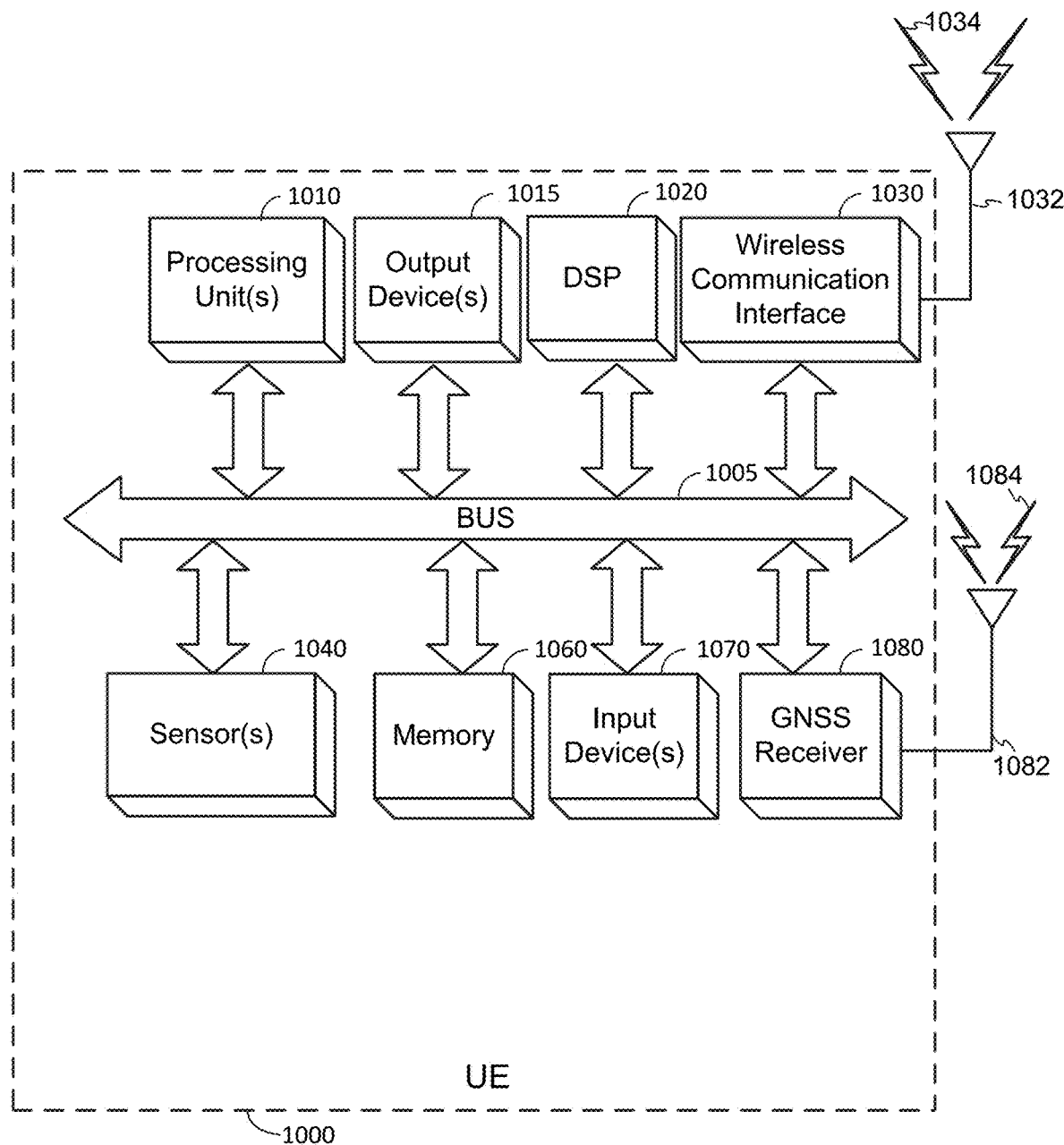
FIG. 10 is a block diagram of an embodiment of a UE, which can be utilized in embodiments as described herein.

Means for performing the functionality at block 810 by a UE may comprise, for example, a bus 1005, processing unit(s) 1010, digital signal processor (DSP) 1020, wireless communication interface 1030, memory 1060, and/or other components of a UE as illustrated in FIG. 10 and described below. Means for performing the functionality at block 810 by a location server may comprise, for example, a bus 1005, processing unit(s) 1210, working memory 1235, wireless communication interface 1233, and/or other components of a computer system as illustrated in FIG. 12 and described below.

At block 820, the functionality comprises determining a length of time for a guard period based on a configuration of the first UE for transmitting the SL-PRS, wherein the guard period comprises a period of time during which the SL-PRS is transmitted by the first UE. More specifically, a guard period may be defined as a period of time related to SL-assisted positioning of a target UE (e.g., the second UE) during which, if a TA adjustment is applied, may degrade the accuracy of any SL-PRS-based measurements. It may include not only a window of time during which the SL-PRS is transmitted (which may include a series of repeated SL-PRS resources, as described with regard to the TDOA-based measurement 700 of FIG. 7) but may also include additional time before and/or afterward to account for processing time, timer adjustment buffer, etc. According to some embodiments, the guard period may be selected from a table of enumerated values (e.g., 1, 2, 5, 10 ms, etc.) where, for example, the smallest value that provides sufficient time for the positioning session and any additional time before and/or afterward. Thus, for example, if SL-PRS for a TDOA-based measurement is transmitted over the course of 20 ms and 4 ms of additional time is needed for processing, timer adjustment buffer, etc., then a 25 ms guard period could be selected as the length of the guard period if it is among the enumerated values for guard period lengths. Depending on desired functionality, the guard period could be defined in terms of a number of slots, symbols, and/or subframes of an orthogonal frequency-division multiplexing (OFDM) communication scheme (such as the OFDM scheme implemented by LTE and 5G), and/or may simply be defined in terms of length of time.

Means for performing the functionality at block 820 by a UE may comprise, for example, a bus 1005, processing unit(s) 1010, digital signal processor (DSP) 1020, memory 1060, and/or other components of a UE as illustrated in FIG. 10 and described below. Means for performing the functionality at block 820 by a location server may comprise, for example, a bus 1005, processing unit(s) 1210, working memory 1235, and/or other components of a computer system as illustrated in FIG. 12 and described below.

The functionality at block 830 comprises sending, to a serving TRP of the first UE, a message indicating the guard period and comprising a TA-related request, wherein the TA-related request includes a request to postpone applying a TA command received by the first UE until after the guard period, or a request for the serving TRP not to send a TA command to the first UE during the guard period. These two different types of requests are reflective of two different types of scenarios.

In a first scenario, the first UE receives a TA command from its serving TRP before or during an SL-PRS positioning session that is to be applied during the SL-PRS positioning session. According to some embodiments, therefore, the functionality of method 800 may be in response to a TA command received by the first UE during the SL-PRS positioning session. As such, any resulting TA adjustment from applying the TA command may interfere with the timing of the transmission of the SL-PRS. Accordingly, in such instances, the first UE can send the serving TRP a request to postpone the application of the TA command until after the guard period. In this first scenario, the TA-related request may therefore comprise the request to postpone applying the TA command received by the first UE until after the guard period, and the message is sent by the first UE, during a SL-PRS positioning session during which the SL-PRS is transmitted by the first UE to the second UE. Because the SL-PRS positioning session may be partially complete, the determination of the guard period may be impacted. As such, the determining the length of time for the guard period (the functionality at block 820) may further be based on her remaining amount of time in the SL-PRS positioning session.

The way in which the message is sent in this first scenario may vary, depending on desired functionality. According to some embodiments, for example, sending the message comprises including the message in UCI (Uplink Control Information), a Radio Resource Control (RRC) message, or a Medium Access Control (MAC) Control Element (CE), or any combination thereof.

In this first scenario, the method 800 may include additional steps if postponement is granted. For example, according to some embodiments, the method 800 may further comprise receiving, at the first UE, an indication from the serving TRP of an acceptance of the TA-related request and postponing the applying of the TA command received by the first UE until after the guard period. As described in more detail below, the serving TRP may grant or deny the postponement based on an applicable TA priority condition. That is, if the serving TRP determines the TA command should be applied to help ensure a high-priority process is executed smoothly, the serving TRP can deny the request. If the request is denied, the first UE can apply the TA command. As described in further detail below, according to some embodiments, the first UE may provide a network node (e.g., the second UE or the location server) with information regarding the TA adjustment to allow the network node to account for the adjustment when determining the location of the second UE.

In a second scenario, the TA-related request comprises the request for the serving TRP not to send the TA command to the first UE during the guard period and the message is sent by a location server or the first UE prior to an SL-PRS positioning session during which the SL-PRS is transmitted by the first UE to the second UE. In this scenario, the request can include a starting time and duration of the guard period. Again, the first UE can communicate this information to the serving TRP using UCI, and RRC message, a MAC-CE message, or the like. The location server can communicate this information to the serving TRP via NRPPa or a similar communication link.

Means for performing the functionality at block 830 by a UE may comprise, for example, a bus 1005, processing unit(s) 1010, digital signal processor (DSP) 1020, wireless communication interface 1030, memory 1060, and/or other components of a UE as illustrated in FIG. 10 and described below. Means for performing the functionality at block 830 by a location server may comprise, for example, a bus 1005, processing unit(s) 1210, working memory 1235, wireless communication interface 1233, and/or other components of a computer system as illustrated in FIG. 12 and described below.

The way in which the serving TRP processes the request can vary, depending on desired functionality. According to some embodiments, the serving TRP may provide an acknowledgment (or ACK) response to the message, confirming that the TA-related request is granted. And the first UE will not receive a TA command, or a previously-received TA command, can be postponed accordingly. On the other hand, the serving TRP may reject the request with a negative acknowledgment (or NACK) response to the message. In the case of a rejection of a request to postpone a previously-received TA command, the first UE would apply the TA command without postponement. In the case of a rejection of a request not to receive a TA command during the guard period, the first UE or location server would be on notice that a TA command could be received during the guard. That is, the serving TRP may or may not issue a TA command during the guard period; there may be no guarantees one way or the other. Accordingly, according some embodiments of the method 800 may further comprise receiving, at the first UE, a response to the message from the serving TRP, wherein the response is indicative of a rejection of the TA-related request. These embodiments may further comprise receiving, at the first UE, a TA command from the serving TRP during the guard period and applying the TA command during the guard period.

Embodiments may respond to the application of a TA command during an SL-PRS positioning session in a variety of ways, depending on desired functionality. According to some embodiments, the first UE may simply cancel the SL-PRS positioning session. Alternatively, embodiments may account for a TA adjustment made from the application of the TA command. In particular, in cases where a serving TRP rejects a TA-related request (e.g., sent using the method 800) and/or as feature that may be independent of a TA-related request, the first UE may track and record its own time adjustment (e.g., the value of A in FIGS. 6 and/or 7). This information can be used to correct the PRS measurements.

The type of information the first UE can track and report may vary. For example, according to some embodiments, the first UE can determine which SL-PRS occasions are impacted by the TA adjustment and send an indication of the impacted occasions (e.g., using a PRS resource ID and occasion times), as well as how they were impacted (e.g., the value of A).

Embodiments may account for different types of TA adjustments. That is, TA commands may result in a single-step adjustment in which all SL-PRS occasions following the adjustment are impacted by the same amount. That is, the value of A is the same for all occasions. Alternatively, some adjustments may be gradual over time, increasing until the full adjustment is reached. In other words, the value of A gradually increases to a desired value, which may result in a different value of A for different SL-PRS occasions. As such, according to some embodiments, the first UE may indicate, in the report, how different occasions are impacted differently.

The network node to which of the first UE provides the report may vary, depending on the circumstances. For example, for UE-based positioning in which the second UE (the target UE) determines its own position based on SL-PRS measurements (e.g., RTT-based or OTDOA-based measurements of SL-PRS), the first UE may provide the report to the second UE. This can be sent directly to the second UE using the SL interface (e.g., SL interface 550 of FIG. 5). In these instances, the second UE can use the information in the reports to account for the TA adjustment in estimating its position. The TA adjustment may be accounted for, for example, by using the value of the adjustment ($\Delta$) to correct the PRS measurement or by determining a level of uncertainty of the PRS measurement based on the value of the adjustment.

Additionally or alternatively, for UE-assisted positioning in which the first and/or second UEs provide information (e.g., as assistance data or a PRS measurement report) to a location server to determine the estimated position of the second UE, the first UE can provide a report to the location server. This can be done via LPP, for example, using a Uu interface (e.g., Uu interface 530 of FIG. 5). Alternatively, this can be done indirectly via the second UE, in which case the first UE would provide the report to the second UE via an SL interface, and the second UE would relay the report to the location server via a Uu interface. (In this case, the second UE may relay positioning-related information from other UEs, which may be used to make similar SL-PRS measurements.) In either case, the location server can use the information in the report to account for a TA adjustment when determining the estimated position of the second UE.

Returning to FIG. 8, the method 800 may therefore provide this functionality in instances in which the TA-related request at block 830 is rejected by the serving TRP. Alternative embodiments of the method 800 may therefore comprise receiving, at the first UE, a response to the message from the serving TRP, where the response is indicative of a rejection of the TA-related request, receiving, at the first UE, a TA command from the serving TRP during the guard period, and applying the TA command during the guard period. Embodiments may further comprise sending, from the first UE, a report to a network node, wherein the report comprises a time adjustment of a transmission time of the SL-PRS based on applying the TA command during the guard period, and a PRS resource identifier (ID) of the SL-PRS.

As noted, the serving TRP may use an applicable TA priority condition when determining whether to grant or reject the TA-related request from the location server or first UE. This process is described in further detail with regard to FIG. 9.

Figure 9:
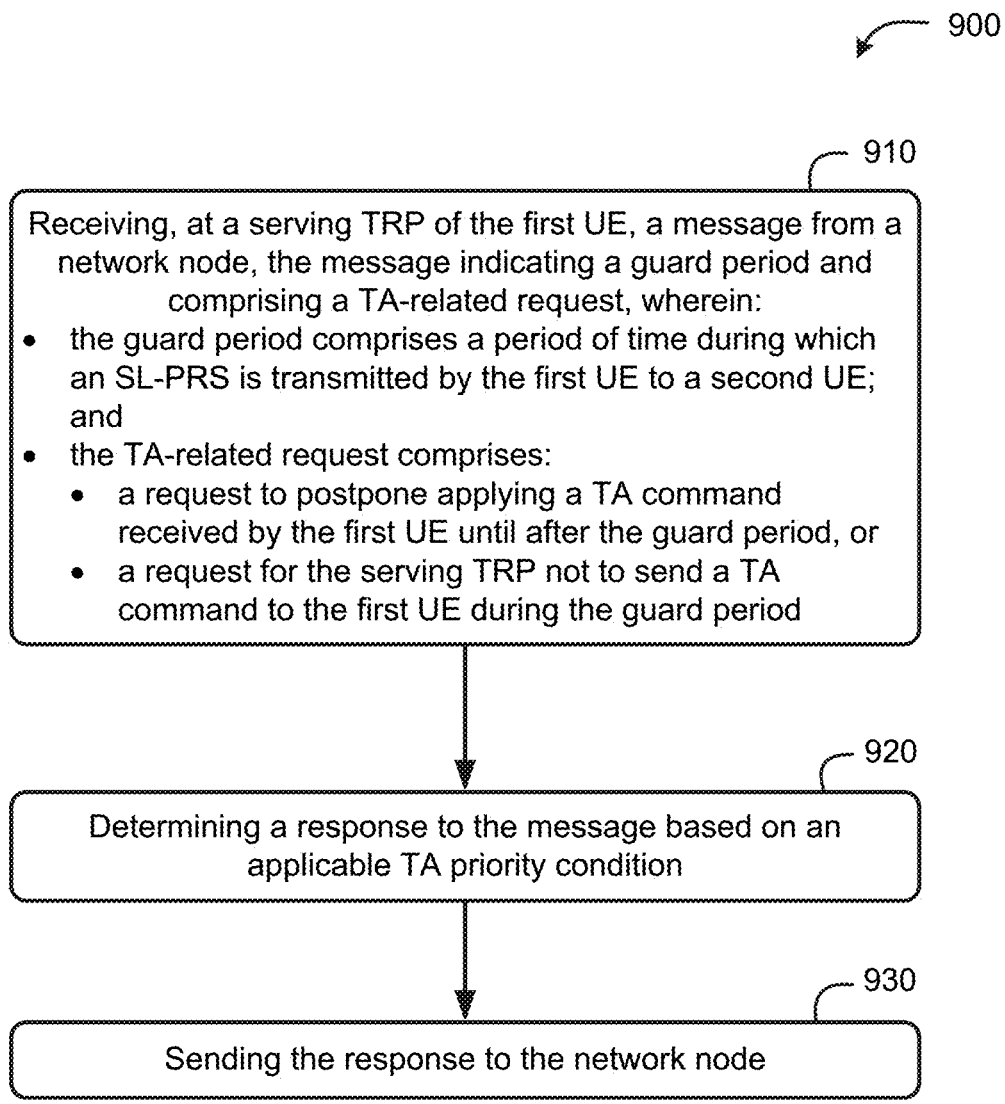

FIG. 9 is a flow diagram of a method 900 of TA handling for SL-assisted positioning of a first UE, according to an embodiment, which can be performed by the serving TRP of the first UE. As such, means for performing the functionality illustrated in one or more of the blocks shown in FIG. 9 may be performed by hardware and/or software components of a TRP. Example components of a TRP are illustrated in FIG. 11, which are described in more detail below.

The method 900 can begin with the functionality at block 910, which comprises receiving, at a serving TRP of the first UE, a message from a network node, the message indicating a guard period and comprising a TA-related request, wherein: the guard period comprises a period of time during which an SL-PRS is transmitted by the first UE to a second UE. The TA-related request comprises: a request to postpone applying a TA command received by the first UE until after the guard period, or a request for the serving TRP not to send a TA command to the first UE during the guard period. Here, the functionality at block 910 may comprise the functionality of the serving TRP when receiving the information sent in block 830 of FIG. 8. As such, the guard period, TA-related request, and other aspects may correspond to those previously described. Moreover, as noted, the request may come from different sources depending on circumstances. Thus, according to some embodiments, the network node comprises the first UE or a location server.

Figure 11:
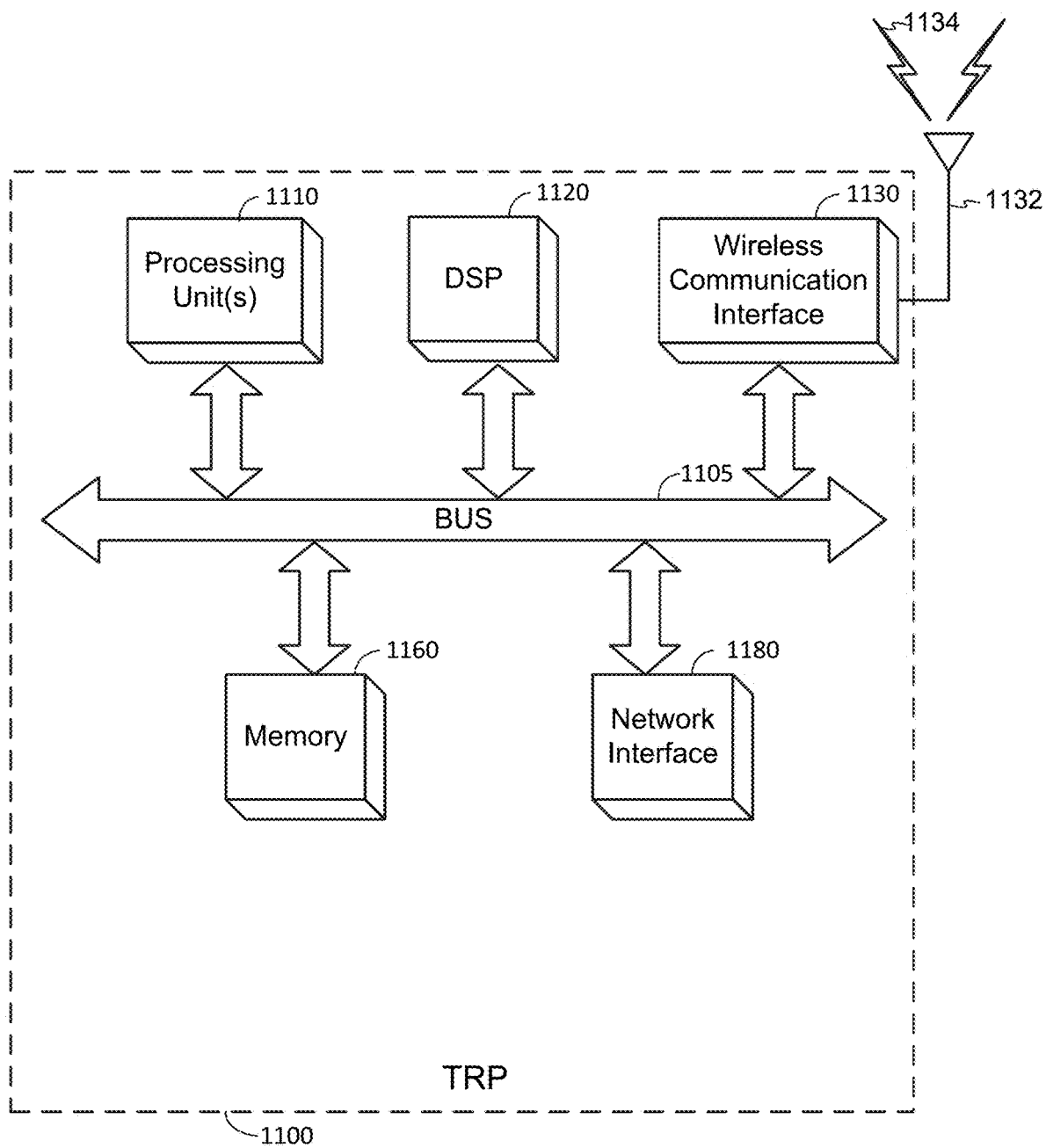
FIG. 11 is a block diagram of an embodiment of a base station, which can be utilized in embodiments as described herein.

Means for performing the functionality at block 910 by a TRP may comprise, for example, a bus 1105, processing unit(s) 1110, digital signal processor (DSP) 1120, wireless communication interface 1130, memory 1160, network interface 1180, and/or other components of a UE as illustrated in FIG. 11 and described below.

At block 920, the functionality comprises determining a response to the message based on an applicable TA priority condition. As discussed previously, the serving TRP can choose whether to grant or deny/reject a request based on whether or not other functions may be impacted by a delay in applying a TA command by the first UE. In implementation, priority rules for granting or rejecting a TA-related request related to SL-PRS positioning of a UE in view of TA priority conditions may be included in applicable communication standards, allowing the serving TRP to implement these priority rules upon receiving a TA-related request.

A TA priority condition comprises a condition that could be impacted by granting the TA-related request. This can include, for example, high-priority conditions such as handover of the first UE between cells (e.g., designating a different serving TRP), high-priority communications (e.g., mission-critical or Ultra-Reliable Low-Latency Communication (URLLC) communications). According to some embodiments, therefore, if the applicable TA priority condition includes either (or both) of these conditions (the first UE being engaged in a handover procedure or the first UE engaged in high-priority medications), then the serving TRP may reject the TA-related request. Otherwise, the serving TRP may accept the TA-related request.

Means for performing the functionality at block 920 by a TRP may comprise, for example, a bus 1105, processing unit(s) 1110, digital signal processor (DSP) 1120, memory 1160, and/or other components of a UE as illustrated in FIG. 11 and described below.

At block 930, the functionality comprises sending the response to the network node. As previously noted, the response may be either indicative of a rejection of TA-related request, or indicative of an acceptance of TA-related request TA-related request. Moreover, the response may be in the form of an ACK or NACK response to the message received at block 910.

Means for performing the functionality at block 930 by a TRP may comprise, for example, a bus 1105, processing unit(s) 1110, digital signal processor (DSP) 1120, wireless communication interface 1130, memory 1160, network interface 1180, and/or other components of a UE as illustrated in FIG. 11 and described below.

FIG. 10 illustrates an embodiment of a UE 1000, which can be utilized as described herein above (e.g., in association with FIGS. 1-9) and may correspond with UE 105, target UE 503, anchor UE 505, UE1 and/or UE2. For example, the UE 1000 can perform one or more of the functions of the method shown in FIG. 8. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 10.

The UE 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, application specific integrated circuits (ASICs), and/or the like), and/or other processing structures or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below). The UE 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1000 to communicate with other devices as described in the embodiments above. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1000 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1000 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 1000, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1010, DSP 1020, and/or a processing unit within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1010 or DSP 1020.

The UE 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 1000 (and/or processing unit(s) 1010 or DSP 1020 within UE 1000). In an aspect, then such code and/or instructions can be used to configure and/or adapt a general-purpose computer (or other device) to perform one or more operations in accordance with the described methods.

FIG. 11 illustrates an embodiment of a TRP 1100, which can be utilized as described herein above (e.g., in association with FIGS. 1-10) and may correspond with base station 120, gNB 210, a ng-eNB 214, TRP 310, TRP 410, and/or TRP 510. The TRP 1100 may be configured to perform one or more of the operations illustrated in the method 900 of FIG. 9 It should be noted that FIG. 11 is meant only to provide a generalized illustration of various components, any or all of which may be utilized as appropriate.

The TRP 1100 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below), according to some embodiments. The TRP 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1100 to communicate as described herein. The wireless communication interface 1130 may permit data and signaling to be communicated (e.g., transmitted and received) to UEs, other base stations/TRPs (e.g., eNB s, gNBs, and ng-eNBs), and/or other network components, computer systems, and/or any other electronic devices described herein. The communication can be carried out via one or more wireless communication antenna(s) 1132 that send and/or receive wireless signals 1134.

The TRP 1100 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

In many embodiments, the TRP 1100 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the TRP 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the TRP 1100 (and/or processing unit(s) 1110 or DSP 1120 within TRP 1100). In an aspect, then such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of a server or other network node described herein with regard to FIGS. 1-11 and may correspond with location server 160, external client 180, LMF 220, and/or other network-connected devices described herein. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processing unit(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may send and receive wireless signals 1255 (e.g., signals according to 5G NR or LTE)

via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of Timing Advance (TA) handling for sidelink (SL)-assisted positioning of a first User Equipment (UE), the method comprising: determining the first UE is configured to transmit an SL Positioning Reference Signal (SL-PRS) to a second UE to perform the SL-assisted positioning; determining a length of time for a guard period based on a configuration of the first UE for transmitting the SL-PRS, wherein the guard period comprises a period of time during which the SL-PRS is transmitted by the first UE; and sending, to a serving Transmission Reception Point (TRP) of the first UE, a message indicating the guard period and comprising a TA-related request, wherein the TA-related request includes: a request to postpone applying a TA command received by the first UE until after the guard period, or a request for the serving TRP not to send a TA command to the first UE during the guard period.

Clause 2. The method of clause 1, wherein: the TA-related request comprises the request to postpone applying the TA command received by the first UE until after the guard period; and the message is sent by the first UE during a SL-PRS positioning session during which the SL-PRS is transmitted by the first UE to the second UE.

Clause 3. The method of clause 1 or 2, wherein determining the length of time for the guard period comprises selecting the length of time from a predetermined list of enumerated values.

Clause 4. The method of any of clauses 1-3, wherein determining the length of time for the guard period is further based on a remaining amount of time remaining in the SL-PRS positioning session.

Clause 5. The method of any of clauses 1-4, wherein sending the message comprises including the message in: UCI (Uplink Control Information), a Radio Resource Control (RRC) message, or a Medium Access Control (MAC) Control Element (CE), or any combination thereof.

Clause 6. The method of any of clauses 1-5, further comprising: receiving, at the first UE, an indication from the serving TRP of an acceptance of the TA-related request; and postponing the applying of the TA command received by the first UE until after the guard period.

Clause 7. The method of clause 1, wherein: the TA-related request comprises the request for the serving TRP not to send the TA command to the first UE during the guard period; and message is sent by a location server or the first UE prior to an SL-PRS positioning session during which the SL-PRS is transmitted by the first UE to the second UE.

Clause 8. The method of any of clauses 1-7, further comprising: receiving, at the first UE, a response to the message from the serving TRP, wherein the response is indicative of a rejection of the TA-related request; receiving, at the first UE, a TA command from the serving TRP during the guard period; and applying the TA command during the guard period.

Clause 9. The method of clause 8, further comprising sending, from the first UE, a report to a network node, wherein the report comprises: a time adjustment of a transmission time of the SL-PRS based on applying the TA command during the guard period, a PRS resource identifier (ID) of the SL-PRS, and an indication of one or more SL-PRS occasions impacted by applying the TA command.

Clause 10. The method of clause 9, wherein the network node comprises a location server or the second UE.

Clause 11. A method of Timing Advance (TA) handling for sidelink (SL)-assisted positioning of a first User Equipment (UE), the method comprising: receiving, at a serving Transmission Reception Point (TRP) of the first UE, a message from a network node, the message indicating a guard period and comprising a TA-related request, wherein: the guard period comprises a period of time during which an SL Positioning Reference Signal (SL-PRS) is transmitted by the first UE to a second UE; and the TA-related request comprises: a request to postpone applying a TA command received by the first UE until after the guard period, or a request for the serving TRP not to send a TA command to the first UE during the guard period; determining a response to the message based on an applicable TA priority condition; and sending the response to the network node.

Clause 12. The method of clause 11, wherein the network node comprises the first UE or a location server.

Clause 13. The method of clause 11 or 12, wherein the response is either: indicative of a rejection of TA-related request, or indicative of an acceptance of TA-related request TA-related request.

Clause 14. The method of any of clauses 11-13, wherein the applicable TA priority condition comprises the first UE being engaged in a handover procedure.

Clause 15. A device for providing Timing Advance (TA) handling for sidelink (SL)-assisted positioning of a first User Equipment (UE), the device comprising: a communication interface; a memory; and one or more processing units communicatively coupled with the communication interface and the memory, the one or more processing units configured to: determine the first UE is configured to transmit an SL Positioning Reference Signal (SL-PRS) to a second UE to perform the SL-assisted positioning; determine a length of time for a guard period based on a configuration of the first UE for transmitting the SL-PRS, wherein the guard period comprises a period of time during which the SL-PRS is transmitted by the first UE; and send, to a serving Transmission Reception Point (TRP) of the first UE via the communication interface, a message indicating the guard period and comprising a TA-related request, wherein the TA-related request includes: a request to postpone applying a TA command received by the first UE until after the guard period, or a request for the serving TRP not to send a TA command to the first UE during the guard period.

Clause 16. The device of clause 15, wherein the device comprises the first UE, and wherein: the TA-related request comprises the request to postpone applying the TA command received by the first UE until after the guard period; and the one or more processing units are configured to send the message during a SL-PRS positioning session during which the SL-PRS is transmitted by the first UE to the second UE.

Clause 17. The device of clause 15 or 16, wherein, to determine the length of time for the guard period, the one or more processing units are configured select the length of time from a predetermined list of enumerated values.

Clause 18. The device of any of clauses 15-17, wherein the one or more processing units are configured to further base determining the length of time for the guard period on a remaining amount of time remaining in the SL-PRS positioning session.

Clause 19. The device of any of clauses 15-18, wherein the one or more processing units are configured to send the message in: UCI (Uplink Control Information), a Radio Resource Control (RRC) message, or a Medium Access Control (MAC) Control Element (CE), or any combination thereof.

Clause 20. The device of any of clauses 15-19, wherein the one or more processing units are further configured to: receive an indication from the serving TRP of an acceptance of the TA-related request; and postpone the applying of the TA command received by the first UE until after the guard period.

Clause 21. The device of clause 15, wherein the device comprises a location server or the first UE, and wherein: the TA-related request comprises the request for the serving TRP not to send the TA command to the first UE during the guard period; and the one or more processing units are configured to send the message prior to an SL-PRS positioning session during which the SL-PRS is transmitted by the first UE to the second UE.

Clause 22. The device of any of clauses 15-21, wherein the device comprises the first UE, and wherein the one or more processing units are further configured to: receive, via the communication interface, a response to the message from the serving TRP, wherein the response is indicative of a rejection of the TA-related request; receive, via the communication interface, a TA command from the serving TRP during the guard period; and apply the TA command during the guard period.

Clause 23. The device of clause 22, wherein the device comprises the first UE, and wherein the one or more processing units are further configured to send a report to a network node, the report comprising: a time adjustment of a transmission time of the SL-PRS based on applying the TA command during the guard period, a PRS resource identifier (ID) of the SL-PRS, and an indication of one or more SL-PRS occasions impacted by applying the TA command.

Clause 24. The device of clause 23, wherein the network node comprises a location server or the second UE.

Clause 25. A device for providing Timing Advance (TA) handling for sidelink (SL)-assisted positioning of a first User Equipment (UE), the device comprising: a communication interface; a memory; and one or more processing units communicatively coupled with the communication interface and the memory, the one or more processing units configured to: receive, via the communication interface, a message from a network node, the message indicating a guard period and comprising a TA-related request, wherein: the guard period comprises a period of time during which an SL Positioning Reference Signal (SL-PRS) is transmitted by the first UE to a second UE; and the TA-related request comprises: a request to postpone applying a TA command received by the first UE until after the guard period, or a request for a serving Transmission Reception Point (TRP) not to send a TA command to the first UE during the guard period; determine a response to the message based on an applicable TA priority condition; and send, via the communication interface, the response to the network node.

Clause 26. The device of clause 25, wherein the network node comprises the first UE or a location server.

Clause 27. The device of clause 25 or 26, wherein the response is either: indicative of a rejection of TA-related request, or indicative of an acceptance of TA-related request TA-related request.

Clause 28. The device of any of clauses 25-27, wherein the applicable TA priority condition comprises the first UE being engaged in a handover procedure.

Clause 29. A device comprising: means for determining a first User Equipment (UE) is configured to transmit an sidelink (SL) Positioning Reference Signal (SL-PRS) to a second UE to perform SL-assisted positioning of the first UE; means for determining a length of time for a guard period based on a configuration of the first UE for transmitting the SL-PRS, wherein the guard period comprises a period of time during which the SL-PRS is transmitted by the first UE; and means for sending, to a serving Transmission Reception Point (TRP) of the first UE, a message indicating the guard period and comprising a Timing Advance (TA)-related request, wherein the TA-related request includes: a request to postpone applying a TA command received by the first UE until after the guard period, or a request for the serving TRP not to send a TA command to the first UE during the guard period.

Clause 30. The device of clause 29, wherein: the TA-related request comprises the request to postpone applying the TA command received by the first UE until after the guard period; and the message is sent by the first UE during a SL-PRS positioning session during which the SL-PRS is transmitted by the first UE to the second UE.

Clause 31. The device of clause 29 or 30, wherein the means for determining the length of time for the guard period comprise means for selecting the length of time from a predetermined list of enumerated values.

Clause 32. The device of any of clauses 29-31, wherein the means for determining the length of time for the guard period further base the length of time for the guard period on a remaining amount of time remaining in the SL-PRS positioning session.

Clause 33. The device of any of clauses 29-32, wherein the means for sending the message comprise means for including the message in: UCI (Uplink Control Information), a Radio Resource Control (RRC) message, or a Medium Access Control (MAC) Control Element (CE), or any combination thereof.

Clause 34. The device of any of clauses 29-33, further comprising: means for receiving an indication from the serving TRP of an acceptance of the TA-related request; and means for postponing the applying of the TA command at the first UE until after the guard period.

Clause 35. The device of clause 29, wherein: the TA-related request comprises the request for the serving TRP not to send the TA command to the first UE during the guard period; and message is sent by a location server or the first UE prior to an SL-PRS positioning session during which the SL-PRS is transmitted by the first UE to the second UE.

Clause 36. The device of any of clauses 29-35, further comprising: means for receiving a response to the message from the serving TRP, wherein the response is indicative of a rejection of the TA-related request; means for receiving a TA command from the serving TRP during the guard period; and means for applying the TA command at the first UE during the guard period.

Clause 37. The device of clause 36, further comprising means for sending, from the first UE, a report to a network node, wherein the report comprises: a time adjustment of a transmission time of the SL-PRS based on applying the TA command during the guard period, a PRS resource identifier (ID) of the SL-PRS, and an indication of one or more SL-PRS occasions impacted by applying the TA command.

Clause 38. The device of clause 37, wherein the network node comprises a location server or the second UE.

Clause 39. A device comprising: means for receiving a message from a network node, the message indicating a guard period and comprising a Timing Advance (TA)-related request, wherein: the guard period comprises a period of time during which an sidelink (SL) Positioning Reference Signal (SL-PRS) is transmitted by a first User Equipment (UE) to a second UE; and the TA-related request comprises: a request to postpone applying a TA command received by the first UE until after the guard period, or a request for a serving Transmission Reception Point (TRP) not to send a TA command to the first UE during the guard period; means for determining a response to the message based on an applicable TA priority condition; and means for sending the response to the network node.

Clause 40. The device of clause 39, wherein the network node comprises the first UE or a location server.

Clause 41. The device of clause 39 or 40, wherein the response is either: indicative of a rejection of TA-related request, or indicative of an acceptance of TA-related request TA-related request.

Clause 42. The device of any of clauses 39-41, wherein the applicable TA priority condition comprises the first UE being engaged in a handover procedure.

Clause 43. A non-transitory computer-readable medium storing instructions for Timing Advance (TA) handling for sidelink (SL)-assisted positioning of a first User Equipment (UE), the instructions comprising code for: determining the first UE is configured to transmit an SL Positioning Reference Signal (SL-PRS) to a second UE to perform the SL-assisted positioning; determining a length of time for a guard period based on a configuration of the first UE for transmitting the SL-PRS, wherein the guard period comprises a period of time during which the SL-PRS is transmitted by the first UE; and sending, to a serving Transmission Reception Point (TRP) of the first UE, a message indicating the guard period and comprising a TA-related request, wherein the TA-related request includes: a request to postpone applying a TA command received by the first UE until after the guard period, or a request for the serving TRP not to send a TA command to the first UE during the guard period.

Clause 44. The non-transitory computer-readable medium of clause 43, wherein: the TA-related request comprises the request to postpone applying the TA command received by the first UE until after the guard period; and the message is sent by the first UE during a SL-PRS positioning session during which the SL-PRS is transmitted by the first UE to the second UE.

Clause 45. The non-transitory computer-readable medium of clause 43 or 44, wherein the code for determining the length of time for the guard period comprises code for selecting the length of time from a predetermined list of enumerated values.

Clause 46. The non-transitory computer-readable medium of any of clauses 43-45, wherein the code for determining the length of time for the guard period further bases the length of time for the guard period on a remaining amount of time remaining in the SL-PRS positioning session.

Clause 47. The non-transitory computer-readable medium of any of clauses 43-46, wherein the code for sending the message comprises code for including the message in: UCI (Uplink Control Information), a Radio Resource Control (RRC) message, or a Medium Access Control (MAC) Control Element (CE), or any combination thereof.

Clause 48. The non-transitory computer-readable medium of any of clauses 43-47, wherein the instructions further comprise code for: receiving, at the first UE, an indication from the serving TRP of an acceptance of the TA-related request; and postponing the applying of the TA command received by the first UE until after the guard period.

Clause 49. The non-transitory computer-readable medium of clause 43, wherein: the TA-related request comprises the request for the serving TRP not to send the TA command to the first UE during the guard period; and message is sent by a location server or the first UE prior to an SL-PRS positioning session during which the SL-PRS is transmitted by the first UE to the second UE.

Clause 50. The non-transitory computer-readable medium of any of clauses 43-49, wherein the instructions further comprise code for: receiving, at the first UE, a response to the message from the serving TRP, wherein the response is indicative of a rejection of the TA-related request; receiving, at the first UE, a TA command from the serving TRP during the guard period; and applying the TA command during the guard period.

Clause 51. The non-transitory computer-readable medium of clause 50, wherein the instructions further comprise code for sending, from the first UE, a report to a network node, wherein the report comprises: a time adjustment of a transmission time of the SL-PRS based on applying the TA command during the guard period, a PRS resource identifier (ID) of the SL-PRS, and an indication of one or more SL-PRS occasions impacted by applying the TA command.

Clause 52. The non-transitory computer-readable medium of clause 51, wherein the network node comprises a location server or the second UE.

Clause 53. A non-transitory computer-readable medium storing instructions for Timing Advance (TA) handling for sidelink (SL)-assisted positioning of a first User Equipment (UE), the instructions comprising code for: receiving, at a serving Transmission Reception Point (TRP) of the first UE, a message from a network node, the message indicating a guard period and comprising a TA-related request, wherein: the guard period comprises a period of time during which an SL Positioning Reference Signal (SL-PRS) is transmitted by the first UE to a second UE; and the TA-related request comprises: a request to postpone applying a TA command received by the first UE until after the guard period, or a request for the serving TRP not to send a TA command to the first UE during the guard period; determining a response to the message based on an applicable TA priority condition; and sending the response to the network node.

Clause 54. The non-transitory computer-readable medium of clause 53, wherein the network node comprises the first UE or a location server.

Clause 55. The non-transitory computer-readable medium of clause 53 or 54, wherein the response is either: indicative of a rejection of TA-related request, or indicative of an acceptance of TA-related request TA-related request.

Clause 56. The non-transitory computer-readable medium of any of clauses 53-55, wherein the applicable TA priority condition comprises the first UE being engaged in a handover procedure.

What is claimed is:

1. A method of Timing Advance (TA) handling for sidelink (SL)-assisted positioning of a first User Equipment (UE), the method comprising:
   receiving, at a first UE, a TA command from a serving Transmission Reception Point (TRP) during a guard period, wherein the guard period comprises a period of time during which an SL Positioning Reference Signal (SL-PRS) is transmitted by the first UE;
   applying the TA command during the guard period;
   transmitting the SL-PRS to a second UE; and
   sending, from the first UE, a report to a network node, wherein the report comprises:
      a time adjustment of a transmission time of the SL-PRS based on applying the TA command during the guard period,
      a PRS resource identifier (ID) of the SL-PRS, and an indication of one or more occasions of the SL-PRS impacted by applying the TA command.

2. The method of claim 1, further comprising, prior to receiving the TA command, determining a length of time for a guard period based on a configuration of the first UE for transmitting the SL-PRS.

3. The method of claim 2, further comprising:
   sending, to a serving Transmission Reception Point (TRP) of the first UE, a message indicating the guard period and comprising a TA-related request, wherein the TA-related request includes:
      a request to postpone applying a TA command received by the first UE until after the guard period, or
      a request for the serving TRP not to send a TA command to the first UE during the guard period; and
   receiving, at the first UE, a response to the message from the serving TRP, wherein the response is indicative of a rejection of the TA-related request;
   wherein the transmitting the SL-PRS is responsive, at least in part, to the rejection of the TA-related request.

4. The method of claim 3, wherein:
   the TA-related request comprises the request to postpone applying the TA command received by the first UE until after the guard period; and
   the message is sent by the first UE during a SL-PRS positioning session during which the SL-PRS is transmitted by the first UE.

5. The method of claim 4, wherein sending the message comprises including the message in:
   UCI (Uplink Control Information),
   a Radio Resource Control (RRC) message, or
   a Medium Access Control (MAC) Control Element (CE), or
   any combination thereof.

6. The method of claim 3, wherein:
   the TA-related request comprises the request for the serving TRP not to send the TA command to the first UE during the guard period; and
   the message is sent by the first UE prior to an SL-PRS positioning session during which the SL-PRS is transmitted by the first UE to the second UE.

7. The method of claim 2, wherein determining the length of time for the guard period comprises selecting the length of time from a predetermined list of enumerated values.

8. The method of claim 2, wherein determining the length of time for the guard period is further based on a remaining amount of time remaining in an SL-PRS positioning session.

9. The method of claim 1, wherein the network node comprises a location server or the second UE.

10. A first User Equipment (UE) comprising:
   a transceiver;
   a memory; and
   one or more processors communicatively coupled with the transceiver and the memory, wherein the one or more processors are configured to:
      receive, via the transceiver, a Timing Advance (TA) command from a serving Transmission Reception Point (TRP) of the first UE during a guard period, wherein the guard period comprises a period of time during which an SL Positioning Reference Signal (SL-PRS) is transmitted by the first UE;
      apply the TA command during the guard period; transmit the SL-PRS via the transceiver to a second UE; and
      send, via the transceiver, a report to a network node, wherein the report comprises:
         a time adjustment of a transmission time of the SL-PRS based on applying the TA command during the guard period,
         a PRS resource identifier (ID) of the SL-PRS, and an indication of one or more occasions of the SL-PRS impacted by applying the TA command.

11. The first UE of claim 10, wherein the one or more processors are further configured to, prior to receiving the TA command, determine a length of time for a guard period based on a configuration of the first UE for transmitting the SL-PRS.

12. The first UE of claim 11, wherein the one or more processors are further configured to:
   send, to a serving Transmission Reception Point (TRP) of the first UE, a message indicating the guard period and comprising a TA-related request, wherein the TA-related request includes:
      a request to postpone applying a TA command received by the first UE until after the guard period, or
      a request for the serving TRP not to send a TA command to the first UE during the guard period; and
   receive, at the first UE, a response to the message from the serving TRP, wherein the response is indicative of a rejection of the TA-related request;
   wherein the transmitting the SL-PRS is responsive, at least in part, to the rejection of the TA-related request.

13. The first UE of claim 12, wherein the one or more processors are further configured to send the message during a SL-PRS positioning session during which the SL-PRS is transmitted by the first UE.

14. The first UE of claim 12, wherein, to send the message, the one or more processors are configured to include the message in:
   UCI (Uplink Control Information),
   a Radio Resource Control (RRC) message, or
   a Medium Access Control (MAC) Control Element (CE), or
   any combination thereof.

15. The first UE of claim 12, wherein the one or more processors are further configured to send the message prior to an SL-PRS positioning session during which the SL-PRS is transmitted by the first UE to the second UE.

16. The first UE of claim 11, wherein, to determine the length of time for the guard period, the one or more processors are configured to select the length of time from a predetermined list of enumerated values.

17. The first UE of claim 11, the one or more processors are configured to determine the length of time for the guard period further based on a remaining amount of time remaining in an SL-PRS positioning session.

18. The first UE of claim 10, wherein the network node comprises a location server or the second UE.

19. An apparatus for Timing Advance (TA) handling for sidelink (SL)-assisted positioning of a first User Equipment (UE), the apparatus comprising:
  means for receiving a TA command from a serving Transmission Reception Point (TRP) during a guard period, wherein the guard period comprises a period of time during which an SL Positioning Reference Signal (SL-PRS) is transmitted by the first UE;
  means for applying the TA command during the guard period; means for transmitting the SL-PRS to a second UE; and
  means for sending a report to a network node, wherein the report comprises:
    a time adjustment of a transmission time of the SL-PRS based on applying the TA command during the guard period,
    a PRS resource identifier (ID) of the SL-PRS, and
    an indication of one or more occasions of the SL-PRS impacted by applying the TA command.

20. The apparatus of claim 19, further comprising means for determining, prior to receiving the TA command, a length of time for a guard period based on a configuration of the first UE for transmitting the SL-PRS.

21. The apparatus of claim 20, further comprising:
  means for sending, to a serving Transmission Reception Point (TRP) of the first UE, a message indicating the guard period and comprising a TA-related request, wherein the TA-related request includes:
    a request to postpone applying a TA command received by the first UE until after the guard period, or
    a request for the serving TRP not to send a TA command to the first UE during the guard period; and
  means for receiving, at the first UE, a response to the message from the serving TRP, wherein the response is indicative of a rejection of the TA-related request;
  wherein the transmitting the SL-PRS is responsive, at least in part, to the rejection of the TA-related request.

22. The apparatus of claim 21, wherein the means for sending the message comprises means for including the message in:
  UCI (Uplink Control Information),
  a Radio Resource Control (RRC) message, or
  a Medium Access Control (MAC) Control Element (CE), or
  any combination thereof.

23. The apparatus of claim 20, wherein the means for determining the length of time for the guard period comprises means for selecting the length of time from a predetermined list of enumerated values.

24. The apparatus of claim 20, wherein determining the length of time for the guard period is further based on a remaining amount of time remaining in an SL-PRS positioning session.

25. The apparatus of claim 19, wherein the network node comprises a location server or the second UE.

26. A non-transitory computer-readable medium storing instructions for Timing Advance (TA) handling for sidelink (SL)-assisted positioning of a first User Equipment (UE), the instructions comprising code for:
  receiving, at a first UE, a TA command from a serving TRP Transmission Reception Point (TRP) during a guard period, wherein the guard period comprises a period of time during which an SL Positioning Reference Signal (SL-PRS) is transmitted by the first UE;
  applying the TA command during the guard period;
  transmitting the SL-PRS to a second UE; and
  sending, from the first UE, a report to a network node, wherein the report comprises:
    a time adjustment of a transmission time of the SL-PRS based on applying the TA command during the guard period,
    a PRS resource identifier (ID) of the SL-PRS, and
    an indication of one or more occasions of the SL-PRS impacted by applying the TA command.

27. The computer-readable medium of claim 26, wherein the instructions further comprise code for, prior to receiving the TA command, determining a length of time for a guard period based on a configuration of the first UE for transmitting the SL-PRS.

28. The computer-readable medium of claim 27, wherein the instructions further comprise code for:
  sending, to a serving Transmission Reception Point (TRP) of the first UE, a message indicating the guard period and comprising a TA-related request, wherein the TA-related request includes:
    a request to postpone applying a TA command received by the first UE until after the guard period, or
    a request for the serving TRP not to send a TA command to the first UE during the guard period; and
  receiving, at the first UE, a response to the message from the serving TRP, wherein the response is indicative of a rejection of the TA-related request;
  wherein the transmitting the SL-PRS is responsive, at least in part, to the rejection of the TA-related request.

29. The computer-readable medium of claim 28, wherein the code for sending the message comprises code for including the message in:
  UCI (Uplink Control Information),
  a Radio Resource Control (RRC) message, or
  a Medium Access Control (MAC) Control Element (CE), or
  any combination thereof.

30. The computer-readable medium of claim 27, wherein the code for determining the length of time for the guard period comprises code for selecting the length of time from a predetermined list of enumerated values.

* * * * *

UNITED STATES PATENT AND TRADEMARK OFFICE
CERTIFICATE OF CORRECTION

PATENT NO. : 11,690,037 B2
APPLICATION NO. : 17/811830
DATED : June 27, 2023
INVENTOR(S) : Jingchao Bao et al.

It is certified that error appears in the above-identified patent and that said Letters Patent is hereby corrected as shown below:

In the Claims

In Claim 26, Column 38, Line 8, should read:
Transmission Reception Point (TRP) during a Signed and Sealed this
First Day of August, 2023

Katherine Kelly Vidal
*Director of the United States Patent and Trademark Office*